US012163507B2

(12) United States Patent
Zhu et al.

(10) Patent No.: US 12,163,507 B2
(45) **Date of Patent: *Dec. 10, 2024**

(54) CONTRACTING MEMBER-BASED ACTUATOR WITH CLUTCH

(71) Applicant: Toyota Motor Engineering & Manufacturing North America, Inc., Plano, TX (US)

(72) Inventors: Yufei Zhu, Ypsilanti, MI (US); Paul A. Gilmore, Ann Arbor, MI (US); Taewoo Nam, Ann Arbor, MI (US); Rikin Gupta, Manassas, VA (US); Xintong Deng, Belleville, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/433,896

(22) Filed: Feb. 6, 2024

(65) Prior Publication Data

US 2024/0280087 A1 Aug. 22, 2024

Related U.S. Application Data

(63) Continuation-in-part of application No. 18/172,637, filed on Feb. 22, 2023.

(51) Int. Cl.
*F03G 7/06* (2006.01)

(52) U.S. Cl.
CPC .................................. *F03G 7/0614* (2021.08)

(58) Field of Classification Search
CPC ...... F03G 7/06143; F03G 7/062; F03G 7/066; H02N 13/00

(Continued)

(56) References Cited

U.S. PATENT DOCUMENTS 1,658,669 A 2/1928 Cohn et al.
2,322,755 A 6/1943 Voorhies (Continued)

FOREIGN PATENT DOCUMENTS

CN 201037277 3/2008
CN 101367433 A 2/2009

(Continued)

OTHER PUBLICATIONS

Rowe et al., U.S. Appl. No. 18/453,395, filed Aug. 22, 2023.

(Continued)

*Primary Examiner* — Shafiq Mian
(74) *Attorney, Agent, or Firm* — Christopher G. Darrow; Darrow Mustafa PC

(57) ABSTRACT

An actuator can include one or more contracting members and a clutch. When an activation input is provided to the one or more contracting members, the one or more contracting members contract, which causes the actuator to morph into an activated configuration. A height of the actuator increases in the activated configuration. The clutch can be configured to maintain the actuator in the activated configuration when the activation input to the one or more contracting members is discontinued. One or more processors can be operatively connected to selectively and/or independently activate the one or more contracting members and the clutch.

38 Claims, 12 Drawing Sheets

(58) Field of Classification Search
USPC .................................................... 60/526–528
See application file for complete search history.

(56) References Cited

U.S. PATENT DOCUMENTS 2,588,706 A 3/1952 Davis
3,394,631 A 7/1968 Thompson
3,706,102 A 12/1972 Grenier
4,063,826 A 12/1977 Riepe
4,244,140 A 1/1981 Kim
4,396,220 A 8/1983 Dieckmann et al.
4,498,851 A 2/1985 Kolm et al.
4,522,447 A 6/1985 Snyder et al.
4,544,988 A 10/1985 Hochstein
4,553,393 A 11/1985 Ruoff
4,595,338 A 6/1986 Kolm et al.
4,779,852 A 10/1988 Wassell
4,780,062 A 10/1988 Yamada et al.
4,806,815 A 2/1989 Homma
4,811,564 A 3/1989 Palmer
4,834,619 A 5/1989 Walton
4,898,426 A 2/1990 Schulz et al.
4,923,000 A 5/1990 Nelson
4,944,755 A 7/1990 Hennequin et al.
4,955,196 A 9/1990 Lin et al.
4,964,402 A 10/1990 Grim et al.
5,069,219 A 12/1991 Knoblich
5,088,115 A 2/1992 Napolitano
5,129,753 A 7/1992 Wesley et al.
5,250,167 A 10/1993 Adolf et al.
5,255,390 A 10/1993 Gross et al.
5,279,123 A 1/1994 Wechsler et al.
5,482,351 A 1/1996 Young et al.
5,488,255 A 1/1996 Sato et al.
5,522,712 A 6/1996 Winn
5,583,844 A 12/1996 Wolf et al.
5,619,177 A 4/1997 Johnson et al.
5,622,482 A 4/1997 Lee
5,662,376 A 9/1997 Breuer et al.
5,678,247 A 10/1997 Vickers
5,686,003 A 11/1997 Ingram et al.
5,747,140 A 5/1998 Heerklotz
5,771,742 A 6/1998 Bokaie et al.
5,846,629 A 12/1998 Gwinn
5,853,005 A 12/1998 Scanlon
5,861,703 A 1/1999 Losinski
6,043,978 A 3/2000 Mody et al.
6,053,553 A 4/2000 Hespelt
6,093,910 A 7/2000 McClintock et al.
6,116,257 A 9/2000 Yokota et al.
6,142,563 A 11/2000 Townsend et al.
6,155,716 A 12/2000 Okamura
6,186,047 B1 2/2001 Baruffaldi
6,227,515 B1 5/2001 Broyles
6,379,393 B1 4/2002 Mavroidis et al.
6,394,001 B1 5/2002 Giesey et al.
6,404,098 B1 * 6/2002 Kayama .................... F03G 7/06
310/307
6,422,010 B1 7/2002 Julien
6,443,524 B1 9/2002 Yu
6,481,799 B1 11/2002 Whalen
6,508,437 B1 1/2003 Davis et al.
6,530,217 B1 3/2003 Yokota et al.
6,546,806 B1 4/2003 Varma
6,591,188 B1 7/2003 Ohler
6,628,522 B2 9/2003 Trautman et al.
6,664,718 B2 12/2003 Perline et al.
6,719,694 B2 4/2004 Weng et al.
6,740,994 B2 5/2004 Lee et al.
6,773,535 B1 8/2004 Wetzel
6,809,462 B2 10/2004 Pelrine et al.
6,896,324 B1 5/2005 Kull et al.
6,910,714 B2 6/2005 Browne et al.
6,912,748 B2 7/2005 VanSickle
6,943,653 B2 9/2005 Hanke et al.
6,972,659 B2 12/2005 von Behrens et al.
6,998,546 B1 2/2006 Schmidt et al.
7,017,345 B2 3/2006 Von Behrens et al.
7,086,322 B2 8/2006 Schulz
7,093,903 B2 8/2006 O'Connor et al.
7,100,990 B2 9/2006 Kimura et al.
7,108,316 B2 9/2006 Barvosa-Carter et al.
7,117,673 B2 * 10/2006 Szilagyi ................. B25J 9/0078
60/527
7,125,077 B2 10/2006 Frank
7,204,472 B2 4/2007 Jones et al.
7,237,847 B2 7/2007 Hancock et al.
7,256,518 B2 8/2007 Gummin
7,293,836 B2 11/2007 Browne et al.
7,306,187 B2 12/2007 Lavan
7,309,104 B2 12/2007 Browne et al.
7,331,616 B2 2/2008 Brei et al.
7,336,486 B2 2/2008 Mongia
7,350,851 B2 4/2008 Barvosa-Carter et al.
7,364,211 B2 4/2008 Niskanen et al.
7,371,052 B2 5/2008 Koeneman
7,446,450 B2 11/2008 Boland et al.
7,448,678 B2 11/2008 Browne et al.
7,476,224 B2 1/2009 Petrakis
7,478,845 B2 1/2009 Mankame et al.
7,484,735 B2 2/2009 Verbrugge et al.
7,501,607 B2 3/2009 Camm et al.
7,506,937 B2 3/2009 Bequet
7,511,402 B2 3/2009 Ito et al.
7,527,312 B1 5/2009 Cucknell et al.
7,556,313 B2 7/2009 Browne et al.
7,578,661 B2 8/2009 Koeneman
7,594,697 B2 9/2009 Browne et al.
7,619,894 B2 11/2009 Wang et al.
7,661,764 B2 2/2010 Ali et al.
7,709,995 B2 5/2010 Hanlon et al.
7,717,520 B2 5/2010 Boren et al.
7,729,828 B2 6/2010 Gandhi
7,731,279 B2 6/2010 Asada et al.
7,735,940 B2 6/2010 Chiu
7,756,246 B2 7/2010 Mikami et al.
7,758,121 B2 7/2010 Browne et al.
7,766,423 B2 8/2010 Alexander et al.
7,770,391 B2 8/2010 Melz
7,814,810 B2 10/2010 Mitteer
7,823,382 B2 11/2010 Ukpai et al.
7,823,972 B2 11/2010 Browne et al.
7,834,527 B2 11/2010 Rivera et al.
7,878,459 B2 2/2011 Mabe et al.
7,883,148 B2 2/2011 Alexander et al.
7,892,630 B1 2/2011 McKnight et al.
7,901,524 B1 3/2011 McKnight et al.
7,905,538 B2 3/2011 Ukpai et al.
7,905,547 B2 3/2011 Lawall et al.
7,909,403 B2 3/2011 Lawall et al.
7,964,290 B2 6/2011 Mullner et al.
7,965,509 B2 6/2011 Campbell et al.
7,971,296 B2 7/2011 Jansen
7,971,939 B2 7/2011 Fujita et al.
8,016,952 B2 9/2011 Ishida et al.
8,038,215 B2 10/2011 Gusto et al.
8,052,112 B2 11/2011 Lawall et al.
8,056,335 B1 11/2011 Brown
8,100,471 B2 1/2012 Lawall et al.
8,109,567 B2 2/2012 Alexander et al.
8,126,615 B2 2/2012 McMillen et al.
8,172,458 B2 5/2012 Petrakis
8,240,677 B2 8/2012 Browne et al.
8,313,108 B2 11/2012 Ac et al.
8,362,882 B2 1/2013 Heubel et al.
8,366,057 B2 2/2013 Vos et al.
8,414,366 B2 4/2013 Browne et al.
8,446,475 B2 5/2013 Topliss et al.
8,448,435 B2 5/2013 Gregory et al.
8,510,924 B2 8/2013 Mankame et al.
8,584,456 B1 11/2013 McKnight
8,585,456 B2 11/2013 Canon
8,593,568 B2 11/2013 Topliss et al.
8,649,242 B2 2/2014 Martin et al.

(56) References Cited

U.S. PATENT DOCUMENTS 8,681,496 B2 3/2014 Dede
8,695,334 B2 4/2014 Lewis et al.
8,702,120 B2 4/2014 Kalisz et al.
8,721,557 B2 5/2014 Chen et al.
8,741,076 B2 6/2014 Gao et al.
8,756,933 B2 6/2014 Topliss et al.
8,793,821 B2 8/2014 Fowkes et al.
8,827,709 B1 9/2014 Gurule et al.
8,830,335 B2 9/2014 Topliss et al.
8,853,916 B2 10/2014 Browne et al.
8,880,141 B2 11/2014 Chen
8,881,347 B2 11/2014 Feinstein
8,894,142 B2 11/2014 Alexander et al.
8,912,709 B2 12/2014 Pollock et al.
8,991,769 B2 3/2015 Gandhi
8,998,320 B2 4/2015 Mankame et al.
9,068,561 B2 6/2015 Gondo
9,086,069 B2 7/2015 Dede
9,140,243 B2 9/2015 Gandhi et al.
9,168,814 B2 10/2015 Gandhi
9,171,686 B2 10/2015 Alacqua et al.
9,180,525 B2 11/2015 Park et al.
9,267,495 B2 2/2016 Kopfer et al.
9,298,207 B2 3/2016 Li
9,347,609 B2 5/2016 Pinto, IV et al.
9,428,088 B1 8/2016 Rajasingham
9,457,813 B2 10/2016 Hoerwick et al.
9,457,887 B2 10/2016 Roe et al.
9,495,875 B2 11/2016 Dowdall et al.
9,512,829 B2 12/2016 Alacqua et al.
9,550,466 B2 1/2017 Gandhi
9,588,020 B2 3/2017 Browne et al.
9,662,197 B2 5/2017 Yun et al.
9,664,182 B2 5/2017 Nicolini et al.
9,664,210 B2 5/2017 Ou et al.
9,684,183 B2 6/2017 Brown et al.
9,696,175 B2 7/2017 Hansen et al.
9,697,708 B2 7/2017 Adrezin et al.
9,714,460 B2 7/2017 Merideth
9,719,534 B2 8/2017 Shevchenko et al.
9,731,828 B2 8/2017 Lichota
9,764,220 B2 9/2017 Keating et al.
9,784,249 B2 10/2017 Li et al.
9,784,590 B2 10/2017 Englehardt et al.
9,827,888 B2 11/2017 Patrick et al.
9,848,814 B2 12/2017 Benson et al.
9,943,437 B2 4/2018 Lowe et al.
9,945,490 B2 4/2018 Dankbaar et al.
9,981,421 B2 5/2018 Macroe et al.
9,994,136 B2 6/2018 Nakada
10,007,263 B1 6/2018 Fields et al.
10,029,618 B2 7/2018 Perez Astudillo et al.
10,059,334 B1 8/2018 Zhu et al.
10,061,350 B2 8/2018 Magi
10,066,829 B2 9/2018 Wong et al.
10,168,782 B1 1/2019 Tchon et al.
10,191,550 B1 1/2019 Nussbaum et al.
10,208,823 B2 2/2019 Kashani
10,299,520 B1 5/2019 Shaffer et al.
10,302,586 B2 5/2019 Sun et al.
10,315,771 B1 6/2019 Rao et al.
10,330,144 B1 6/2019 Alqasimi et al.
10,330,400 B2 6/2019 Dede
10,335,044 B2 7/2019 Banet et al.
10,349,543 B2 7/2019 Sreetharan et al.
10,355,624 B2 7/2019 Majdi et al.
10,371,229 B2 8/2019 Gandhi et al.
10,371,299 B2 8/2019 Leffler
10,377,278 B2 8/2019 Ketels et al.
10,427,634 B2 10/2019 Gandhi et al.
10,434,973 B2 10/2019 Gandhi et al.
10,441,491 B2 10/2019 Wyatt et al.
10,459,475 B2 10/2019 Gandhi et al.
10,479,246 B2 11/2019 Meingast et al.
10,532,672 B1 1/2020 Pinkelman et al.
10,583,757 B2 3/2020 Ketels et al.
10,591,078 B2 3/2020 Oehler et al.
10,647,237 B2 5/2020 Song
10,677,310 B2 6/2020 Gandhi et al.
10,682,931 B2 6/2020 Rowe et al.
10,759,320 B2 9/2020 Mochizuki
10,773,487 B2 9/2020 Frigerio et al.
10,781,800 B2 9/2020 Brown et al.
10,814,514 B2 10/2020 Aihara
10,843,611 B2 11/2020 Caruss et al.
10,933,974 B2 3/2021 Tsuruta et al.
10,960,793 B2 3/2021 Gandhi et al.
10,965,172 B2 3/2021 Dede et al.
10,993,526 B2 5/2021 Vandewall et al.
10,995,779 B2 5/2021 Keplinger et al.
11,048,329 B1 6/2021 Lee et al.
11,091,060 B2 8/2021 Pinkelman et al.
11,125,248 B2 9/2021 Joshi et al.
11,137,045 B2 10/2021 Gandhi et al.
11,180,052 B2 11/2021 Severgnini et al.
11,241,842 B2 2/2022 Gandhi et al.
11,247,584 B2 2/2022 Breitweg et al.
11,248,592 B1 2/2022 Tsuruta et al.
11,269,891 B2 3/2022 Frank et al.
11,285,844 B2 3/2022 Gandhi et al.
11,353,009 B1 6/2022 Rowe et al.
11,356,255 B1 6/2022 Emelyanov et al.
11,370,330 B2 6/2022 Gandhi et al.
11,372,481 B2 6/2022 Leroy et al.
11,377,007 B2 7/2022 Samain et al.
11,458,874 B2 10/2022 Nagai et al.
11,460,009 B1 10/2022 Tsuruta et al.
11,460,010 B1 10/2022 Tsuruta et al.
11,467,669 B2 10/2022 Liu et al.
11,472,325 B1 10/2022 Tsuruta et al.
11,486,421 B2 11/2022 Keplinger et al.
11,536,255 B1 12/2022 Rowe
11,542,925 B1 1/2023 Rowe et al.
11,577,471 B2 2/2023 Gandhi et al.
11,591,076 B2 2/2023 Song et al.
11,592,010 B1 2/2023 Panwar et al.
11,592,037 B1 2/2023 Rowe et al.
11,603,153 B1 3/2023 Trager et al.
11,603,828 B2 3/2023 Gummin et al.
11,624,376 B2 4/2023 Rowe et al.
11,628,898 B1 4/2023 Trager et al.
11,642,083 B2 5/2023 Severgnini et al.
11,649,808 B2 5/2023 Tsuruta et al.
11,668,287 B2 6/2023 Naly et al.
11,702,015 B2 7/2023 Pinkelman et al.
11,732,735 B2 8/2023 Song et al.
11,750,115 B2 9/2023 Saneyoshi et al.
11,752,901 B2 9/2023 Gandhi et al.
11,795,924 B2 10/2023 Rowe
11,840,161 B2 12/2023 Schmalenberg et al.
11,841,008 B1 12/2023 Panwar et al.
11,885,428 B2 1/2024 Panwar et al.
11,897,379 B2 2/2024 Tsuruta et al.
11,913,436 B2 2/2024 Easton et al.
11,927,206 B2 3/2024 Rowe et al.
2002/0130754 A1 9/2002 Alacqua et al.
2002/0179663 A1 12/2002 Moore et al.
2003/0000605 A1 1/2003 Homma
2003/0182041 A1 9/2003 Watson
2004/0035108 A1 2/2004 Szilagyi
2004/0041998 A1 3/2004 Haddad
2004/0104580 A1 6/2004 Spiessl et al.
2004/0118854 A1 6/2004 Kutun
2004/0145230 A1 7/2004 Fujita et al.
2004/0195888 A1 10/2004 Frye
2004/0256920 A1 12/2004 Gummin et al.
2004/0261411 A1 12/2004 MacGregor
2005/0023086 A1 2/2005 Szilagyi
2005/0082897 A1 4/2005 Ropp et al.
2005/0066810 A1 5/2005 Schulz
2005/0111177 A1 5/2005 Kwitek
2005/0146147 A1 7/2005 Niskanen et al.
2005/0198904 A1 9/2005 Browne et al.
2005/0199455 A1 9/2005 Browne

(56) References Cited

U.S. PATENT DOCUMENTS

2005/0199845 A1 9/2005 Jones et al.
2005/0206096 A1 9/2005 Browne et al.
2005/0210874 A1 9/2005 Browne et al.
2005/0211198 A1 9/2005 Froeschle et al.
2005/0227607 A1 10/2005 Stevenson et al.
2005/0253425 A1 11/2005 Asada et al.
2006/0033312 A1 2/2006 Barvosa-Carter et al.
2006/0038643 A1 2/2006 Xu et al.
2006/0038745 A1 2/2006 Naksen et al.
2006/0074325 A1 4/2006 Karo et al.
2006/0201149 A1 9/2006 Biggs et al.
2006/0223637 A1 10/2006 Rosenberg
2006/0226013 A1 10/2006 Decre et al.
2006/0244293 A1 11/2006 Buffa
2006/0265965 A1 11/2006 Butera et al.
2007/0025575 A1 2/2007 Oser et al.
2007/0046074 A1 3/2007 Satta et al.
2007/0063566 A1 3/2007 Browne et al.
2007/0084220 A1 4/2007 Asada et al.
2007/0188004 A1 8/2007 Browne et al.
2007/0205853 A1 9/2007 Taya et al.
2007/0236071 A1 10/2007 Fujita et al.
2007/0246285 A1 10/2007 Browne et al.
2007/0246898 A1 10/2007 Keefe et al.
2007/0246979 A1 10/2007 Browne et al.
2007/0271939 A1 11/2007 Ichigaya
2007/0277877 A1 12/2007 Ghorbal et al.
2008/0006353 A1 1/2008 Elzey et al.
2008/0018198 A1* 1/2008 Sohn ...................... F03G 7/065 310/307
2008/0085436 A1 4/2008 Langan et al.
2008/0100118 A1 5/2008 Young et al.
2008/0114218 A1 5/2008 Suyama et al.
2008/0219501 A1 9/2008 Matsumoto
2008/0267770 A1 10/2008 Webster et al.
2008/0271559 A1 11/2008 Garscha et al.
2008/0272259 A1 11/2008 Zavattieri et al.
2008/0307786 A1 12/2008 Hafez et al.
2009/0008973 A1 1/2009 Browne
2009/0009656 A1 1/2009 Honda et al.
2009/0030576 A1 1/2009 Periot et al.
2009/0041085 A1 2/2009 Petrakis
2009/0108607 A1 4/2009 Browne et al.
2009/0115284 A1 5/2009 Liang et al.
2009/0131752 A1 5/2009 Park
2009/0143730 A1 6/2009 De Polo et al.
2009/0173305 A1 7/2009 Alexander et al.
2009/0212158 A1 8/2009 Mabe et al.
2009/0218858 A1 9/2009 Lawall et al.
2009/0224584 A1 9/2009 Lawall et al.
2009/0224587 A1 9/2009 Lawall et al.
2009/0241537 A1 10/2009 Browne et al.
2009/0242285 A1 10/2009 Whetstone, Jr.
2009/0283643 A1 11/2009 Sar et al.
2009/0284059 A1 11/2009 Gupta et al.
2010/0001568 A1 1/2010 Trybus et al.
2010/0027119 A1 2/2010 Kollar et al.
2010/0031525 A1 2/2010 Allezy et al.
2010/0036567 A1 2/2010 Gandhi
2010/0066142 A1 3/2010 Gross et al.
2010/0192567 A1 8/2010 Butera
2010/0212312 A1 8/2010 Rudduck
2010/0221124 A1 9/2010 Ikushima et al.
2010/0244505 A1 9/2010 Demick et al.
2010/0282902 A1 11/2010 Rajasingham
2010/0287965 A1 11/2010 Bryant
2010/0294476 A1 11/2010 Gomi et al.
2010/0308689 A1 12/2010 Rahman et al.
2010/0326070 A1 12/2010 Hao et al.
2011/0021932 A1 1/2011 Kim et al.
2011/0030380 A1 2/2011 Widdle, Jr. et al.
2011/0038727 A1 2/2011 Vos et al.
2011/0111839 A1 5/2011 Lesley et al.
2011/0120119 A1 5/2011 Alexander et al.
2011/0150669 A1 6/2011 Frayne et al.
2011/0179790 A1 7/2011 Pretorius
2011/0217031 A1 9/2011 Eromaki
2011/0300358 A1 12/2011 Blohowiak et al.
2012/0019216 A1 1/2012 Lewis et al.
2012/0049095 A1 3/2012 Yamasaki
2012/0056459 A1 3/2012 Harden
2012/0081337 A1 4/2012 Camp, Jr. et al.
2012/0109025 A1 5/2012 Weinberg et al.
2012/0136126 A1 5/2012 Rousseau
2012/0181896 A1 7/2012 Kornbluh et al.
2012/0232783 A1 9/2012 Calkins et al.
2012/0237309 A1 9/2012 Park et al.
2012/0239183 A1 9/2012 Mankame et al.
2012/0267928 A1 10/2012 Mankame et al.
2012/0276807 A1 11/2012 Cabrera
2012/0292155 A1 11/2012 Gunter
2012/0297763 A1 11/2012 Mankame et al.
2012/0319445 A1 12/2012 Zolno et al.
2013/0005442 A1 1/2013 Erickson et al.
2013/0011806 A1 1/2013 Gao et al.
2013/0043354 A1 2/2013 Shome et al.
2013/0075210 A1 3/2013 Langbein et al.
2013/0098029 A1 4/2013 Pinto, IV et al.
2013/0188313 A1 7/2013 Dede
2013/0205770 A1 8/2013 Browne et al.
2013/0227943 A1 9/2013 Mance et al.
2014/0130491 A1 5/2014 Gandhi et al.
2014/0168894 A1 6/2014 Dede
2014/0196633 A1 7/2014 Shaw
2014/0207333 A1 7/2014 Vandivier et al.
2014/0239677 A1 8/2014 Laib et al.
2014/0250881 A1 9/2014 Yamamoto
2014/0265468 A1 9/2014 Greenhill et al.
2014/0277739 A1 9/2014 Kornbluh et al.
2014/0298794 A1 10/2014 Flaschentrager et al.
2014/0314976 A1 10/2014 Niiyama et al.
2014/0316269 A1 10/2014 Zhang et al.
2014/0333088 A1 11/2014 Lang et al.
2014/0338324 A1 11/2014 Jasklowski
2015/0016968 A1 1/2015 Grabowska et al.
2015/0130220 A1 5/2015 Preisler et al.
2015/0185764 A1 7/2015 Magi
2015/0197173 A1 7/2015 Hulway
2015/0202993 A1 7/2015 Mankame et al.
2015/0274078 A1 10/2015 Alacqua et al.
2015/0289994 A1 10/2015 Engeberg et al.
2015/0290015 A1 10/2015 Elahinia et al.
2015/0331488 A1 11/2015 Grant et al.
2016/0004298 A1 1/2016 Mazed et al.
2016/0032997 A1 2/2016 Seepersad et al.
2016/0061345 A1 3/2016 Jackson, Jr.
2016/0082984 A1 3/2016 Schmidt
2016/0084665 A1 3/2016 Englehardt et al.
2016/0221475 A1 8/2016 Sugiyama
2016/0246374 A1 8/2016 Carter et al.
2016/0278459 A1 9/2016 Hilty
2016/0325837 A1 11/2016 Erhel et al.
2016/0345088 A1 11/2016 Vilermo et al.
2016/0375835 A1 12/2016 Murray et al.
2017/0116792 A1 4/2017 Jelinek et al.
2017/0121068 A1 5/2017 Foshansky et al.
2017/0123499 A1 5/2017 Eid
2017/0148102 A1 5/2017 Franke et al.
2017/0153707 A1 6/2017 Subramanian et al.
2017/0158104 A1 6/2017 Le et al.
2017/0166222 A1 6/2017 James
2017/0174236 A1 6/2017 Worden et al.
2017/0203432 A1 7/2017 Andrianesis
2017/0240075 A1 8/2017 McCoy et al.
2017/0252260 A1 9/2017 Gummin et al.
2017/0328384 A1 11/2017 Goto et al.
2017/0355288 A1 12/2017 Barbat et al.
2018/0001113 A1 1/2018 Streeter
2018/0012433 A1 1/2018 Ricci
2018/0036198 A1 2/2018 Mergl et al.
2018/0073491 A1 3/2018 Gissen et al.
2018/0084915 A1 3/2018 Norman et al.
2018/0115260 A1 4/2018 Chiba et al.
2018/0130347 A1 5/2018 Ricci et al.

(56) References Cited

U.S. PATENT DOCUMENTS

2018/0132825 A1 5/2018 Tachibana
2018/0134191 A1 5/2018 Ketels et al.
2018/0141562 A1 5/2018 Singhal
2018/0149141 A1 5/2018 Cullen et al.
2018/0151035 A1 5/2018 Maalouf et al.
2018/0249772 A1 9/2018 Koo et al.
2018/0251234 A1 9/2018 Wang
2018/0264975 A1 9/2018 Bonk et al.
2018/0281621 A1 10/2018 Kaku et al.
2018/0286189 A1 10/2018 Motamedi et al.
2018/0321703 A1 11/2018 Gandhi et al.
2018/0345841 A1 12/2018 Prokhorov et al.
2018/0348759 A1 12/2018 Freeman et al.
2018/0355991 A1 12/2018 Pfahler
2019/0005272 A1 1/2019 Gault et al.
2019/0023161 A1 1/2019 Sullivan et al.
2019/0039525 A1 2/2019 Hu
2019/0041986 A1 2/2019 Rihn et al.
2019/0042857 A1 2/2019 Endo et al.
2019/0059608 A1 2/2019 Yan et al.
2019/0061307 A1 2/2019 Chen et al.
2019/0083022 A1 3/2019 Huang
2019/0135150 A1 5/2019 Gao et al.
2019/0143869 A1 5/2019 Sequi et al.
2019/0154122 A1 5/2019 Lima et al.
2019/0197842 A1 6/2019 Long et al.
2019/0232842 A1 8/2019 Boccuccia et al.
2019/0291649 A1 9/2019 Ito
2020/0010001 A1 1/2020 Pinkelman et al.
2020/0015493 A1 1/2020 Ergun et al.
2020/0015593 A1 1/2020 Norman et al.
2020/0032822 A1 1/2020 Keplinger et al.
2020/0088175 A1 3/2020 Li et al.
2020/0112269 A1 4/2020 Taghavi et al.
2020/0179168 A1 6/2020 Kelleher et al.
2020/0197250 A1 6/2020 Wyatt et al.
2020/0223325 A1 7/2020 Pinkelman et al.
2020/0238854 A1 7/2020 Gandhi et al.
2020/0247274 A1 8/2020 Gandhi et al.
2020/0276971 A1 9/2020 Takeda et al.
2020/0282878 A1* 9/2020 Gandhi .................... B60N 2/99
2020/0298732 A1 9/2020 Gandhi et al.
2020/0307416 A1 10/2020 Gandhi et al.
2020/0309102 A1 10/2020 Henderson et al.
2020/0339242 A1 10/2020 Tsuruta et al.
2020/0377036 A1 12/2020 Lee et al.
2020/0378370 A1 12/2020 Kopfer et al.
2021/0095646 A1 4/2021 Blecha et al.
2021/0118597 A1 4/2021 Pinkelman et al.
2021/0132396 A1 5/2021 Shin et al.
2021/0153754 A1 5/2021 Ozawa et al.
2021/0162457 A1 6/2021 Eberfors
2021/0221269 A1 7/2021 Baranowski et al.
2021/0236061 A1 8/2021 Severgnini et al.
2021/0237809 A1 8/2021 Rowe et al.
2021/0265922 A1 8/2021 Nakagawa
2022/0001530 A1 1/2022 Sameoto et al.
2022/0012458 A1 1/2022 Uetabira
2022/0031178 A1 2/2022 Brulet et al.
2022/0106941 A1 4/2022 Easton
2022/0119202 A1 4/2022 Morrissey et al.
2022/0154703 A1* 5/2022 Shin ...................... F03G 7/0636
2022/0164079 A1 5/2022 Severgnini et al.
2022/0196109 A1 6/2022 Gandhi et al.
2022/0242328 A1 8/2022 Pinkelman et al.
2022/0258656 A1 8/2022 Little
2022/0299016 A1 9/2022 Tsuruta et al.
2022/0307485 A1 9/2022 Gummin et al.
2022/0314857 A1 10/2022 Tsuruta et al.
2022/0316458 A1 10/2022 Tsuruta et al.
2022/0412325 A1 12/2022 Köpfer et al.
2023/0078040 A1 3/2023 Rowe et al.
2023/0088911 A1 3/2023 Song et al.
2023/0120436 A1 4/2023 Tsuruta et al.
2023/0124526 A1 4/2023 Tsuruta et al.
2023/0136197 A1 5/2023 Gilmore et al.
2023/0179122 A1 6/2023 Palaniswamy et al.
2023/0191953 A1 6/2023 Panwar et al.
2023/0193929 A1 6/2023 Rowe et al.
2023/0287871 A1 9/2023 Rowe
2023/0312109 A1 10/2023 Joshi et al.
2023/0331371 A1 10/2023 Gupta et al.
2023/0331372 A1 10/2023 Gupta et al.
2023/0337827 A1 10/2023 Pinkelman et al.
2024/0060480 A1 2/2024 Panwar et al.

FOREIGN PATENT DOCUMENTS

CN 101417152 A 4/2009
CN 102333504 A 1/2012
CN 102152309 B 11/2012
CN 103038094 A 4/2013
CN 103147511 A 6/2013
CN 102026842 B 7/2013
CN 103935495 A 7/2014
CN 102765354 B 11/2014
CN 104290617 A 1/2015
CN 204774820 U 11/2015
CN 105517664 A 4/2016
CN 106168523 A 11/2016
CN 107111473 A 1/2017
CN 206029888 U 3/2017
CN 105946515 B 4/2018
CN 108100228 A 6/2018
CN 108819806 A 11/2018
CN 106014897 B 12/2018
CN 106956254 B 3/2019
CN 109572966 A 4/2019
CN 209010975 U 6/2019
CN 105003405 B 7/2019
CN 107485536 B 1/2020
CN 112411375 A 2/2021
DE 10155119 B4 5/2003
DE 20309196 U1 11/2003
DE 10222022 A1 12/2003
DE 102010021902 A1 12/2011
DE 102016210214 A1 12/2017
DE 102019204866 A1 10/2020
DE 102008021679 B4 1/2021
EP 1420094 A1 5/2004
EP 1519055 A2 3/2005
EP 1904337 B1 10/2010
EP 2723069 A1 4/2014
EP 3196484 A1 7/2017
FR 3058108 A1 5/2018
JP S5870892 U 5/1983
JP S61277898 A 12/1986
JP H03276698 A 12/1991
JP H06033895 A 6/1994
JP H09168285 A 6/1997
JP H10337061 A 12/1998
JP 2003276698 A 10/2003
JP 3706899 B2 10/2005
JP 2006000347 A 1/2006
JP 2006006581 A 1/2006
JP 2006248456 A 9/2006
JP 2008014470 A 1/2008
JP 2008138558 A 6/2008
JP 2008154447 A 7/2008
JP 4273902 B2 6/2009
JP 2009162233 A 7/2009
JP 2010117457 A 5/2010
JP 4576281 B2 11/2010
JP 5760241 8/2015
JP 2017175155 A 9/2017
JP 2018188035 A 11/2018
JP 2019094789 A 6/2019
JP 2019101988 A 6/2019
KR 20050056526 A 6/2005
KR 1020130005989 1/2013
KR 101395364 B1 5/2014
KR 101861620 B1 4/2018
KR 1020180074003 A 7/2018
KR 101931791 B1 12/2018

(56) References Cited

FOREIGN PATENT DOCUMENTS

| | | | |
|---|---|---|---|
| KR | 20210052091 | A | 5/2021 |
| KR | 20210086518 | A | 7/2021 |
| KR | 102298464 | B1 | 9/2021 |
| WO | 02011648 | A1 | 2/2002 |
| WO | 2005004321 | A1 | 1/2005 |
| WO | 2009079668 | A2 | 6/2009 |
| WO | 2009111362 | A2 | 9/2009 |
| WO | 2011017071 | A2 | 2/2011 |
| WO | 2011111769 | A1 | 9/2011 |
| WO | 2014145018 | A2 | 9/2014 |
| WO | 2014172320 | A1 | 10/2014 |
| WO | 2015037600 | A1 | 3/2015 |
| WO | 2016017057 | A1 | 2/2016 |
| WO | 2016130719 | A2 | 8/2016 |
| WO | 2017077541 | A1 | 5/2017 |
| WO | 2019043599 | A1 | 3/2019 |
| WO | 2019097437 | A1 | 5/2019 |
| WO | 2019173227 | A1 | 9/2019 |
| WO | 2020110091 | A2 | 6/2020 |
| WO | 2020183360 | A1 | 9/2020 |
| WO | 2021118185 | A2 | 6/2021 |

OTHER PUBLICATIONS

Rowe et al., U.S. Appl. No. 18,329,217, filed Jun. 5, 2023.
Pinkelman et al., U.S. Appl. No. 18/452,343, filed Aug. 18, 2023.
Pinkelman et al., U.S. Appl. No. 18/452,376, filed Aug. 18, 2023.
Rowe et al., U.S. Appl. No. 18/452,602, filed Aug. 21, 2023.
Rowe et al., U.S. Appl. No. 18/452,734, filed Aug. 21, 2023.
Jani et al., "A review of shape memory alloy research, applications, and opportunities", Elsevier, 2014, pp. 1078-1113 (36 pages).
Tiseo et al., "A Shape Memory Alloy Based Tuneable Dynamic Vibration Absorber for Vibration Tonal Control", Journal of Theoretical and Applied Mechanics, 2010, pp. 135-153 (19 pages).
Williams et al., "Dynamic modelling of a shape memory alloy adaptive tuned vibration absorber", Elsevier, Journal of Vibration and Sound, 2005, pp. 211-234 (24 pages).
Araki et al., "Integrated mechanical and material design of quasi-zero-stiffness vibration isolator with superelastic Cu—Al—Mn shape memory alloy bars", Journal of Sound and Vibration, 2015 (34 pages).
Casciati et al., "Performance of a base isolator with shape memory alloy bars", Earthquake Engineering and Engineering Vibration, Dec. 2007 (8 pages).
Correa et al., "Mechanical Design of Negative Stiffness Honeycomb Materials", Integrating Materials and Manufacturing Innovation, 4:10, pp. 1-11, 2015 (11 pages).
Ferguson-Pell, "Seat Cushion Selection", J. Rehab. Res. Dev., Special Supplement #2, 23(3), pp. 49-73, 1986 (25 pages).
Miga Motor Company, "Miga AdrenaLine—A Space Age Wire," retrieved from the Internet: <https://migamotors.com/index.php?main_page=product_info&cPath=1&products_id=37>, [retrieved Mar. 26, 2021] (1 page).
Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).
Edragon Technology Corporation, "What is Electrostatic Chuck?" retrieved from the Internet: <https://edragoncorp.weebly.com/what-is-electrostatic-chuck.html>, 2014 (8 pages).
Strittmatter et al., "Intelligent materials in modern production—Current trends for thermal shape memory alloys," Procedia Manufacturing, vol. 30, pp. 347-356, 2019 (10 pages).
Shunk, "GM awarded DOE money to research Shape Memory Alloy heat engines," dated Nov. 2, 2009, retrieved from the Internet: <https://www.autoblog.com/2009/11/02/gm-awarded-doe-money-to-research-shape-memory-alloy-heat-engines/>, [retrieved Mar. 26, 2021] (2 pages).
Gummin, "Shape Memory Alloy Massage for Seating Surfaces," dated Jun. 15, 2018, retrieved from the Internet: <https://contest.techbriefs.com/2018/entries/consumer-products/8871> (3 pages).
Stoeckel, "Shape Memory Actuators for Automotive Applications," Materials & Design. vol. 11, No. 6, pp. 302-307, Dec. 1990 (6 pages).
Katayama et al., "Shape Memory Alloy Wire Actuated Hinge Mechanism for Deploying Segmented Plates," Bulletin of Osaka Prefecture University, Series A, vol. 45, No. 2, 1996, pp. 119-124 (8 pages).
Rowe et al., U.S. Appl. No. 63/485,398, filed Feb. 16, 2023.
Rowe et al., U.S. Appl. No. 18,399,026, filed Dec. 28, 2023.
Zhu et al., U.S. Appl. No. 18/172,637, filed Feb. 22, 2023.
Rowe et al., U.S. Appl. No. 18/468,029, filed Sep. 15, 2023.
Pinkelman et al., U.S. Appl. No. 17/729,522, filed Apr. 26, 2022.
Ou et al., "jamSheets: Thin Interfaces with Tunable Stiffness Enabled by Layer Jamming," Proceedings of the 8th International Conference on Tangible, Embedded, and Embodied Interaction, 2014 (8 pages).
Ou et al., "aeroMorph—Heat-sealing Inflatable Shape-change Materials for Interaction Design," Proceedings of the 29th Annual Symposium on User Interface Software and Technology (2016) pp. 121-132 (10 pages).
Zhu et al., U.S. Appl. No. 18/399,075, filed Dec. 28, 2023.
Song et al., "Resistance Modelling of SMA Wire Actuators", Canadian Institute for NDE, International Workshop: Smart Materials, Structures & NDT in Aerospace Conference, Nov. 2011 (10 pages).
Motzki, "Efficient SMA Actuation—Design and Control Concepts", Proceedings, vol. 64, No. 1, MDPI, 2020 (9 pages).
Arduino Documentation, "Secrets of Arduino PWM", last revision May 27, 2024, retrieved from the Internet: <https://docs.arduino.cc/tutorials/generic/secrets-of-arduino-pwm/>, [retrieved Jun. 1, 2024] (13 pages).
Spiess, "#321 7 Sensors tested: Measuring Current with Microcontrollers (Arduino, ESP32, ESP8266)", uploaded on Apr. 5, 2020 by user "Andreas Spiess" accessible via the Internet: < https://www.youtube.com/watch?v=cG8moaufmQs>.
International Search Report and Written Opinion for International Application No. PCT/US2024/014926 mailed on May 29, 2024 (11 pages).
Barbarino et al., "A review on shape memory alloys with applications to morphing aircraft", Smart Materials and Structures, Apr. 2014 (19 pages).
"HapWRAP: Soft Growing Wearable Haptic Device", retrieved from the Internet: <https://smartdevicess.createdsites.com>, dated May 27, 2019 (18 pages).
Yilmaz et al., "Detecting Vital Signs with Wearable Wireless Sensors", Sensors, Dec. 2010 (26 pages).
Choi et al. "Highly conductive, stretchable, and biocompatible Ag—Au core-sheath nanowire composite for wearable and implantable bioelectronics", Nature Nanotechnology 13, No. 11, 2018 (36 pages).
Gao et al., "Wearable Microfluidic Diaphragm Pressure Sensor for Health and Tactile Touch Monitoring", Advanced Materials, Oct. 2017 (15 pages).
Kweon et al., "Wearable high-performance pressure sensors based on three-dimensional electrospun conductive nanofibers", NPG Asia Materials 2018 (12 pages).
Wang et al. "Monitoring of the central blood pressure waveform via a conformal ultrasonic device", Nat Biomed Eng, Sep. 2018 (22 pages).
Agharese et al. "hapWRAP: Soft Growing Wearable Haptic Device", 2018 IEEE International Conference on Robotics and Automation (ICRA), May 2018 (7 pages).
Gao et al., "Fully integrated wearable sensor arrays for multiplexed in situ perspiration analysis", Nature, Jan. 2016 (30 pages).
Jitosho et al. "Exploiting Bistability for High Force Density Reflexive Gripping", 2019 International Conference on Robotics and Automation (ICRA), May 2019 (7 pages).
Wikipedia, "Slap bracelet", retrieved from the Internet: <https://en.wikipedia.org/wiki/Slap_bracelet>, [retrieved Mar. 12, 2021] (2 pages).
Maffiodo et al. "Three-Fingered Gripper with Flexure Hinges Actuated by Shape Memory Alloy Wires", Int. J. of Automation Technology, vol. 11, No. 3, pp. 355-360, 2017 (6 pages).

(56) References Cited

OTHER PUBLICATIONS

Buckner et al. “Roboticizing fabric by integrating functional fibers”, Proceedings of the National Academy of Sciences, Oct. 2020 (10 pages).
Blain, “Refrigerants not required: Flexible metal cooling prototype demonstrates extreme efficiency”, retrieved from the Internet: <https://newatlas.com/shape-memory-alloy-nitinol-heating-cooling/58837/> [retrieved Apr. 1, 2024], dated Mar. 13, 2019 (13 pages).
Taniguchi, “Flexible Artificial Muscle Actuator Using Coiled Shape Memory Alloy Wires”, APCBEE Procedia 7, pp. 54-59, May 2013 (6 pages).
Acome et al., “Hydraulically amplified self-healing electrostatic actuators with muscle-like performance”, Science 359, pp. 61-65, 2018 (5 pages).
Wang et al., “Recent Progress in Artificial Muscles for Interactive Soft Robotics”, Advanced Materials, vol. 33, Issue 19, published Oct. 27, 2020 (48 pages).
Liang et al., “Comparative study of robotic artificial actuators and biological muscle”, Advances in Mechanical Engineering, 2020 (25 pages).
El-Atab et al., “Soft Actuators for Soft Robotic Applications: A Review”, Advanced Intelligent Systems 2020 (37 pages).
Pagoli et al., “Review of soft fluidic actuators: classification and materials modeling analysis”, Smart Materials and Structures, vol. 31, 2021 (31 pages).
Park et al., “A Novel Fabric Muscle Based on Shape Memory Alloy Springs”, Soft Robotics, vol. 7, No. 3, 2020 (11 pages).
Ebay, “Cardboard Dividers 5 Sets 7.5" X 10.5" X 4" High 12 cell”, retrieved from the Internet: <https://www.ebay.comitm/175101454003var=0&mkevt=1&mkcid=1&mkrid=711-53200-19255-0&campid=5337076261&toolid=10049&customid=ACF63RFK9J675c23041e8b13f9c32042ed51988cf3> [retrieved Jan. 20, 2022](1 page).
Cazottes et al., “Bistable Buckled Beam: Modeling of Actuating Force and Experimental Validations”, Journal of Mechanical Design, 2009 (10 pages).
Cazottes et al., “Design of Actuation for Bistable Structures Using Smart Materials,” Advances in Science and Technology, vol. 54, pp. 287-292, 2008 (1st Page/Abstract only).
Cazottes et al., “Actuation of bistable buckled beams with Macro-Fiber Composites,” IEEE/RSJ International Conference on Intelligent Robots and Systems, pp. 564-569, 2008 (7 pages).
Haines et al., “New Twist on Artificial Muscles,” Proceedings of the National Academy of Sciences, vol. 113, No. 42, pp. 11709-11716, Oct. 18, 2016 (9 pages).
Inoue et al., “High-performance structure of a coil-shaped soft-actuator consisting of polymer threads and carbon nanotube yarns,” AIP Advances 8, 2018, (8 pages).
Abbas et al., “A Physics Based Model for Twisted and Coiled Actuator” 2017 IEEE International Conference on Robotics and Automation (ICRA), pp. 6121-6126, 2017 (6 pages).
Haines et al., “Artificial Muscles from Fishing Line and Sewing Thread” (Supplementary Materials) Science 343, 868, 2014 (36 pages).
Yip et al., “On the Control and Properties of Supercoiled Polymer Artificial Muscles,” IEEE Transactions on Robotics 2017 (11 pages).
alibaba.com, “Hangzhou Phase Change Technology Co., Ltd”, Retrieved from the Internet: <https://hzfeijie.en.alibaba.com/product/1448845650-220286736/phase_change_material_PCM_balls.html#!>, [Retrieved May 2, 2017] (3 pages).
Goodfellow Corporation, “New to Our Range: A Magnetic Shape Memory Alloy that Converts Magnetic Field Energy into Kinetic Energy,” <retrieved from the Internet: http://www.goodfellowusa.com/corporate/news/us/Jun. 2011/us.htm> [retrieved Jan. 23, 2012] (2 pages).
Goodfellow Corporation, “Magnetic Shape Memory Material”, <retrieved from the Internet: http://www.goodfellowusa.com/larger-quantities/alloys/magnetic-shape-memory-material/> [retrieved Jan. 23, 2012] (3 pages).
Sherrit et al., “Planar Rotary Motor using Ultrasonic Horns”, Proc. SPIE 7981, Sensors and Smart Structures Technologies for Civil, Mechanical, and Aerospace Systems 2011, 79810O, Apr. 13, 2011 (8 pages).
Henry, “Dynamic Actuation Properties of Ni—Mn—Ga Ferromagnetic Shape Memory Alloys”, submitted to the Massachusetts Institute of Technology Department of Materials Science and Engineering on May 22, 2002, images on pp. 64-66 (202 pages).
Zhu et al., U.S. Appl. No. 18/433,896, filed Feb. 6, 2024.
Rowe et al., U.S. Appl. No. 18/178,302, filed Mar. 3, 2023.

* cited by examiner

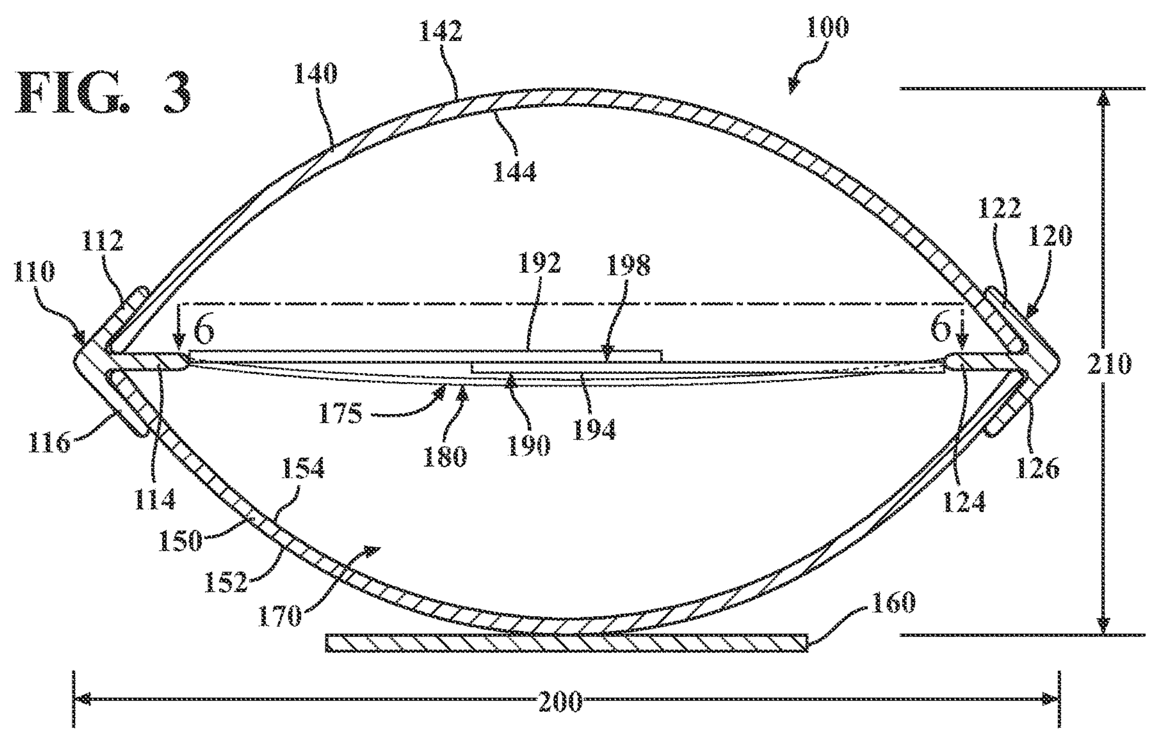
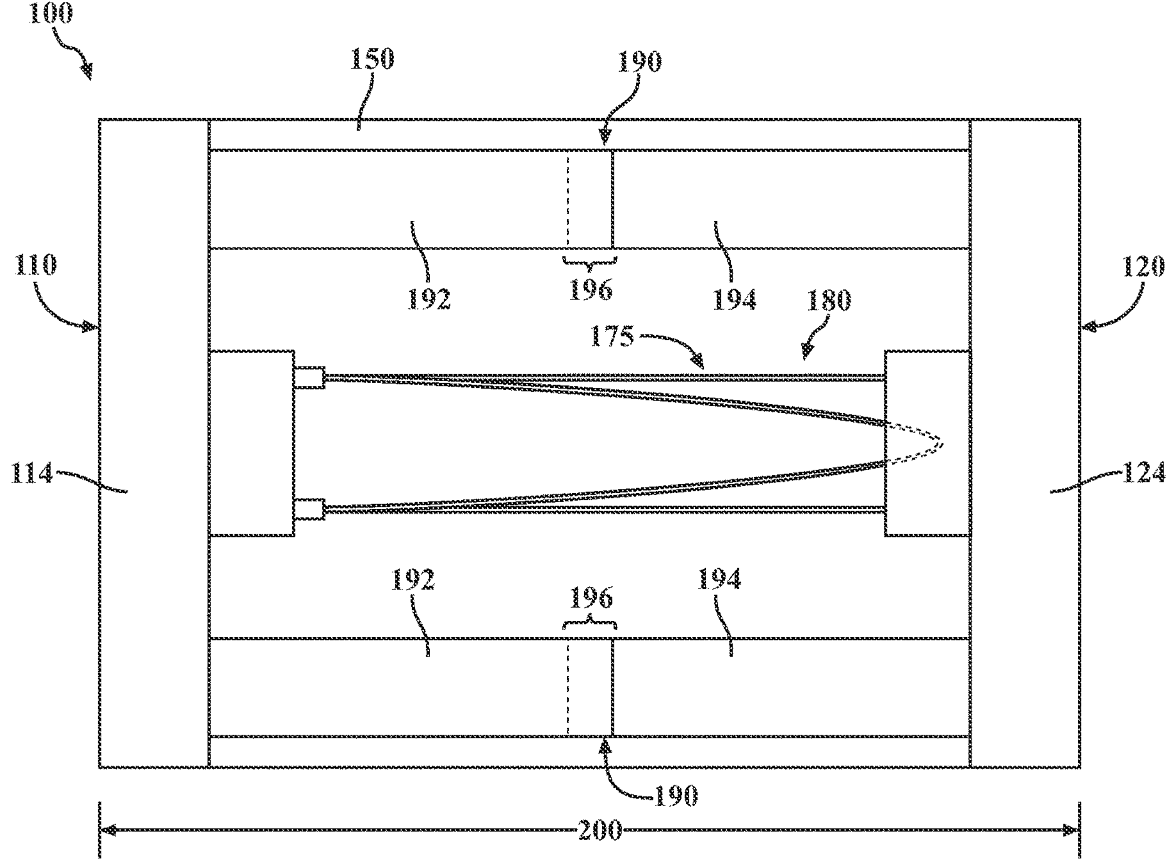
FIG. 4

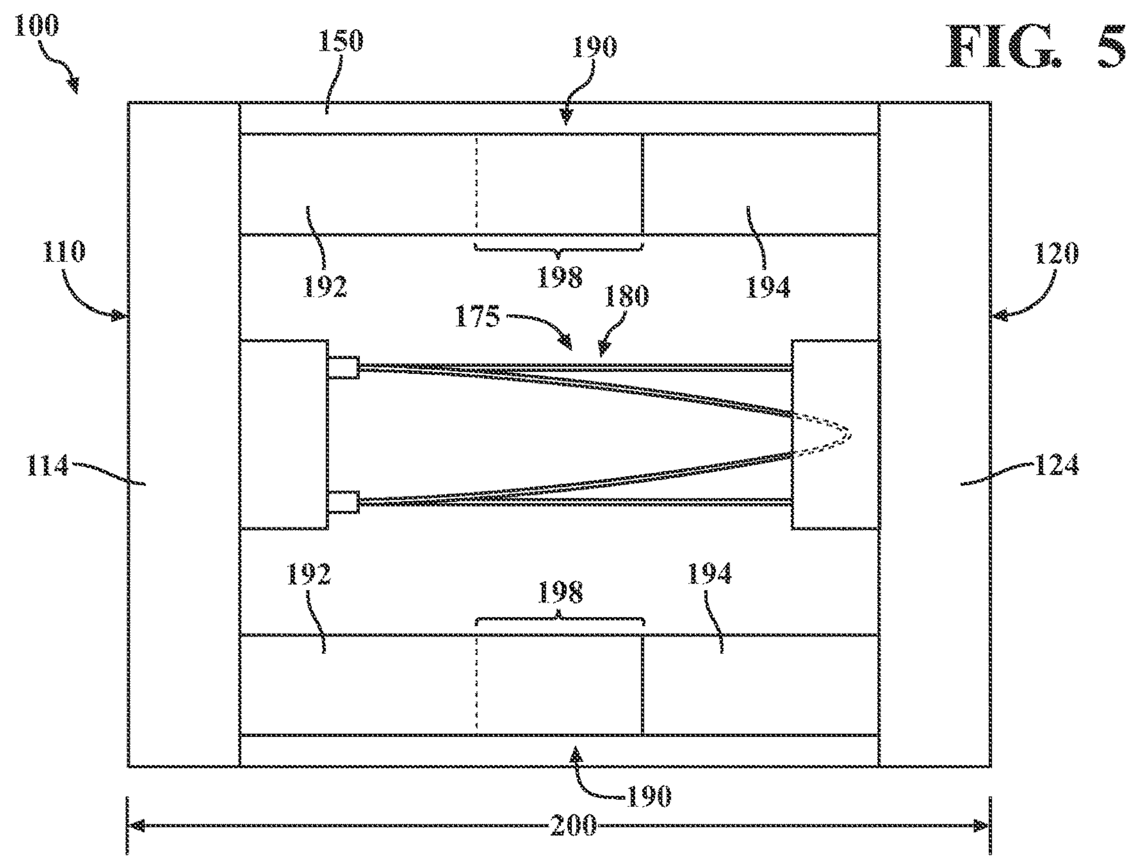
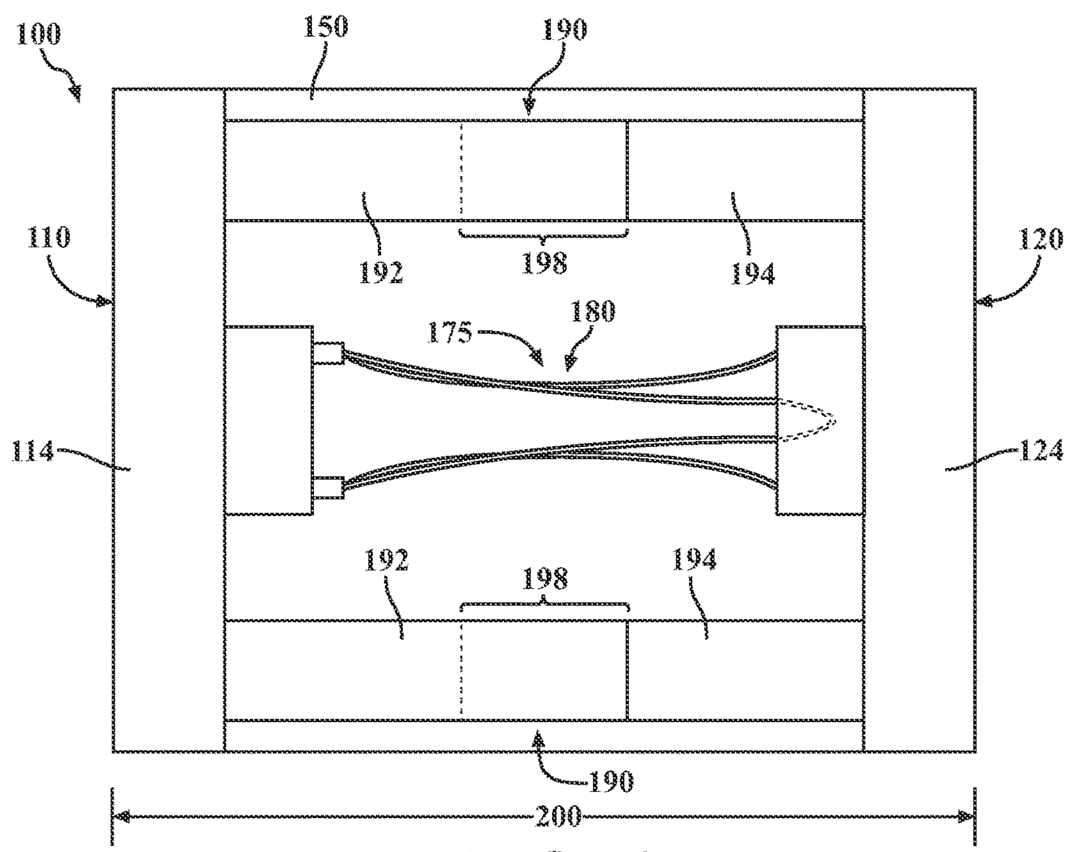
FIG. 6

142
100
140
144
122
120
112
110
1192
1198
210
175
116
180
1190
1194
126
154
114
124
150
152
170
160
200

142
100
140
144
210
122
120
112
1495
110
1492
1493
1494
175
180
116
1490
126
114
154
124
150
152
170
160
200

CONTRACTING MEMBER-BASED ACTUATOR WITH CLUTCH

CROSS-REFERENCE TO RELATED APPLICATIONS

This application is a continuation-in-part of U.S. patent application Ser. No. 18/172,637, filed on Feb. 22, 2023, which is incorporated herein by reference in its entirety.

FIELD

The subject matter described herein relates in general to actuators and, more particularly, to actuators that use contracting members.

BACKGROUND

Shape memory alloys change shape when an activation input is provided to the material. When the activation input is discontinued, the material can return to its original shape. To maintain the activated shape of the shape memory alloy, the activation input must be continuously provided.

SUMMARY

In one respect, the present disclosure is directed to an actuator. The actuator can include one or more actuator body members. The actuator can include one or more contracting members and a clutch. The one or more contracting members and the clutch can be operatively connected to at least one of the one or more actuator body members. When an activation input is provided to the one or more contracting members, the one or more contracting members contract. The contraction can cause the actuator to morph into an activated configuration in which a height of the actuator increases. The clutch can be configured to maintain the actuator in the activated configuration when the activation input to the one or more contracting members is discontinued.

In another respect, the present disclosure is directed to a system. The system can include an actuator that has one or more contracting members and a clutch. The system can include one or more processors operatively connected to selectively and independently activate the one or more contracting members and the clutch. When an activation input is provided to the one or more contracting members, the one or more contracting members can contract, which, in turn, causes the actuator to morph into an activated configuration in which a height of the actuator increases. The clutch can be configured to maintain the actuator in the activated configuration when the activation input to the one or more contracting members is discontinued.

In still another respect, the present disclosure is directed to an actuation method for an actuator. The actuator can include one or more contracting members and a clutch. The method can include activating the one or more contracting members to cause the one or more contracting members to contract, thereby causing the actuator to morph into an activated configuration. Thus, a height of the actuator increases. The method can include activating the clutch while the one or more contracting members are activated. The method can include deactivating the one or more contracting members, whereby the actuator is maintained in the activated configuration by the clutch.

BRIEF DESCRIPTION OF THE DRAWINGS

FIG. 3 is a cross-sectional view of the actuator of FIG. 2, showing a maintained activated condition.

FIG. 4 is a cross-sectional plan view of the actuator of FIG. 1.

FIG. 5 is a cross-sectional plan view of the actuator of FIG. 2

FIG. 6 is a cross-sectional plan view of the actuator of FIG. 3.

DETAILED DESCRIPTION

Figure 1:
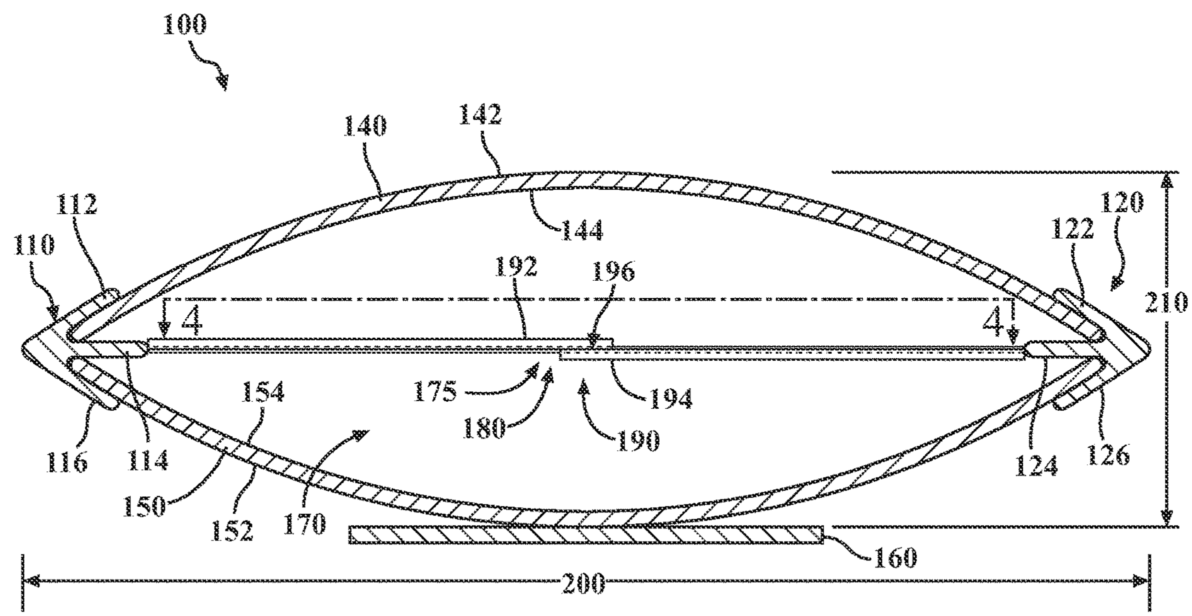
FIG. 1 is a cross-sectional view of an example of an actuator, showing a non-activated condition.

The energy consumption to maintain a shape memory alloy in an activated state is often prohibitively large for many applications. Further, when an activation input to the shape memory alloy is discontinued, it takes a relatively long period of time for the shape memory alloy to sufficiently cool down to return to its original state. This process may not be fast enough for many applications.

Accordingly, arrangement described herein are directed to, among other things, an actuator. The actuator can include one or more contracting members and a clutch. When an activation input is provided to the one or more contracting members, the one or more contracting members can contract, thereby causing the actuator to morph into an activated configuration in which a height of the actuator increases. The clutch can be configured to maintain the actuator in the activated configuration when the activation input to the one or more contracting members is discontinued.

Thus, a high actuation force/torque can be provided by the contracting member(s), and the activated configuration of the actuator can be maintained at low energy consumption level by the clutch.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-19, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Arrangements described herein are directed to an actuator. Generally, the actuator can include one or more contracting members and a clutch. The actuator can have any suitable form. One example of an actuator will be described herein. However, it will be understood this example is not intended to be limiting. Indeed, there are numerous actuator designs that include one or more contracting members and an electrostatic clutch and that can be operated according to actuation schemes described herein.

Referring to FIGS. 1-6, an example of an actuator 100 is shown. The actuator 100 can have any suitable configuration. The actuator 100 can include one or more actuator body members. For instance, the actuator can include a first outer member 140 and a second outer member 150.

The actuator 100 can include a first outer member 140. The first outer member 140 can have a bowed shape. The first outer member 140 can have a convex side 142 and a concave side 144. In some arrangements, the first outer member 140 can be made of a single piece of material. In other arrangements, the first outer member 140 can be made of a plurality of pieces of material. In some arrangements, the first outer member 140 can be made of a plurality of layers. The first endcap 110 and the second endcap 120 can be made of any suitable material. In some arrangements, the first outer member 140 can be made of a flexible to accommodate changes to the actuator 100 when activated and deactivated.

The actuator 100 can include a second outer member 150. The second outer member 150 can have a bowed shape. The second outer member 150 can have a convex side 152 and a concave side 154. In some arrangements, the second outer member 150 can be made of a single piece of material. In other arrangements, the second outer member 150 can be made of a plurality of pieces of material. In some arrangements, the second outer member 150 can be made of a plurality of layers. The first endcap 110 and the second endcap 120 can be made of any suitable material. In some arrangements, the second outer member 150 can be made of a flexible to accommodate changes to the actuator 100 when activated and deactivated.

In some arrangements, the actuator 100 can include a base 160. The base 160 can provide stability to the actuator 100. In some arrangements, the base 160 can be operatively connected to the convex side 152 of the second outer member 150. Any suitable manner of operative connection can be provided, such as one or more fasteners, one or more adhesives, one or more welds, one or more brazes, one or more forms of mechanical engagement, or any combination thereof. In other arrangements, the base 160 and the second outer member 150 can be formed together as a unitary structure. The base 160 can have any suitable size, shape, and/or configuration. The base 160 can be a substantially flat structure. In one or more arrangements, the base 160 can be substantially rectangular. In some arrangements, the base 160 can be configured as a cradle into which the actuator 100 (e.g., the second outer member 150) can be received. The base 160 can be made of any suitable material. The base 160 can be made of the same material as the second outer member 150, or the base 160 can be made of a different material.

In some arrangements, the actuator 100 can include a first endcap 110 and a second endcap 120. The first endcap 110 and the second endcap 120 can be spaced apart. The first endcap 110 and the second endcap 120 can face toward each other.

The first endcap 110 and the second endcap 120 can have any suitable size, shape, and/or configuration. In one or more arrangements, the first endcap 110 and the second endcap 120 can be substantially mirror images of each other. In one or more arrangements, the first endcap 110 can have three prongs, including an upper prong 112, a middle prong 114, and a lower prong 116. Similarly, the second endcap 120 can have three prongs, including an upper prong 122, a middle prong 124, and a lower prong 126.

The first endcap 110 and the second endcap 120 can be made of any suitable material. The first endcap 110 and the second endcap 120 can be substantially rigid structures. In some arrangements, the prongs 112, 114, 116, 122, 124, 126 of the first and second endcaps 110, 120 can be flexible to accommodate changes to the actuator 100 when activated and deactivated. The first and second endcaps 110, 120 can be oriented such that the middle prong 114 of the first endcap 110 is substantially aligned with the middle prong 124 of the second endcap 120.

The first outer member 140 can be operatively connected to the first endcap 110 and the second endcap 120. For instance, the first outer member 140 can be operatively connected to the upper prong 112 of the first endcap 110 and to the upper prong 122 of the second endcap 120. Any suitable manner of operative connection can be provided, such as one or more fasteners, one or more adhesives, one or more welds, one or more brazes, one or more forms of mechanical engagement, or any combination thereof. In some arrangements, one or more portions of the first outer member 140, such as the ends, can be operatively connected to the middle prong 114 of the first endcap 110 and the middle prong 124 of the second endcap 120.

The second outer member 150 can be operatively connected to the first endcap 110 and the second endcap 120. For instance, the second outer member 150 can be operatively connected to the lower prong 116 of the first endcap 110 and to the lower prong 126 of the second endcap 120. Any suitable manner of operative connection can be provided, such as one or more fasteners, one or more adhesives, one or more welds, one or more brazes, one or more forms of mechanical engagement, or any combination thereof. In some arrangements, one or more portions of the second outer member 150, such as the ends, can be operatively connected to the middle prong 114 of the first endcap 110 and the middle prong 124 of the second endcap 120.

The first outer member 140 and the second outer member 150 can be composed of or include a substantially flexible material. The first outer member 140 and the second outer member 150 can be reversibly deformed, such that the first outer member 140 and the second outer member 150 will not be damaged during the deformation. Damage can include cracking, breaking, fracturing, or other forms of inelastic deformation. In some implementations, the flexible material is a flexible polymer. Specific examples of flexible polymers which can be used various implementations include rubber (including natural rubber, styrene-butadiene, polybutadiene, neoprene, ethylene-propylene, butyl, nitrile, silicone), polycarbonates, acrylic, polyesters, polyethylenes, polypropylenes, nylon, polyvinyl chlorides, polystyrenes, elastomers, polyolefins, and others flexible polymers known to persons skilled in the art. In some implementations, the flexible material can be exposed to a degree of stretch selected in the range of about 1% to about 1300%, such as about 10% to about 1300%, or about 100% to about 1300% without resulting in mechanical failure (e.g., tearing, cracking, or inelastic deformation). In further implementations, the flexible material can be deformed to a radius of curvature selected in the range of 100 micrometers (μm) to 3 meters (m) without mechanical failure.

The first outer member 140 and the second outer member 150 can be oriented such that their concave sides 144, 154 face each other. The first outer member 140 and the second outer member 150 can define a cavity 170.

The actuator 100 can include one or more contracting members 175. When an activation input is provided to the contracting member(s) 175, the contracting member(s) 175 can contract, thereby causing the actuator 100 to morph into an activated configuration in which a dimension (e.g., the height) of the actuator 100 increases. In some arrangements, the contracting member(s) 175 can be one or more shape memory material members 180. In some arrangements, the shape memory material member(s) 180 can include shape memory alloys and/or shape memory polymers. As an example, the contracting member(s) 175 can be one or more shape memory alloy wires.

The shape memory material members 180 can be operatively connected to the first endcap 110 and the second endcap 120. More particularly, the shape memory material member 180 can be operatively connected to the middle prong 114 of the first endcap 110 and the middle prong 124 of the second endcap 120. Any suitable manner of operative connection can be provided, such as one or more fasteners, one or more adhesives, one or more welds, one or more brazes, one or more forms of mechanical engagement, or any combination thereof. The shape memory material member(s) 180 can be located within the cavity 170.

In some arrangements, there can be a single shape memory material member 180. In such case, the shape memory material member 180 can, for example, extend straight across the cavity from the first endcap 110 and the second endcap 120. In another example, the shape memory material member 180 can extend in a zig zag or serpentine pattern between the first endcap 110 and the second endcap 120. In some arrangements, the first endcap 110 and the second endcap 120 can be configured to allow the shape memory material member 180 to turn around and extend in the opposite direction. As an example, the first endcap 110 and the second endcap 120 can include a plurality of slots to enable such a turnaround of the shape memory material member(s) 180.

In some arrangements, there can be a plurality of shape memory material members 180. In such case, the shape memory material members 180 can be distributed, arranged, and/or oriented in any suitable manner. For instance, the shape memory material members 180 can extend substantially parallel to each other. In other arrangements, one or more of the shape memory material members 180 can extend non-parallel to the other shape memory material members 180. In some instances, some of the plurality of shape memory material members 180 may cross over each other.

The phrase "shape memory material" includes materials that changes shape when an activation input is provided to the shape memory material and, when the activation input is discontinued, the material substantially returns to its original shape. Examples of shape memory materials include shape memory alloys (SMA) and shape memory polymers (SMP).

In one or more arrangements, the shape memory material members 180 can be shape memory material wires. As an example, the shape memory material members 180 can be shape memory alloy wires. Thus, when an activation input (i.e., heat) is provided to the shape memory alloy wire(s), the wire(s) can contract. Shape memory alloy wire(s) can be heated in any suitable manner, now known or later developed. For instance, shape memory alloy wire(s) can be heated by the Joule effect by passing electrical current through the wires. In some instances, arrangements can provide for cooling of the shape memory alloy wire(s), if desired, to facilitate the return of the wire(s) to a non-activated configuration.

The wire(s) can have any suitable characteristics. For instance, the wire(s) can be high temperature wires with austenite finish temperatures from about 80 degrees Celsius to about 110 degrees Celsius. The wire(s) can have any suitable diameter. For instance, the wire(s) can be from about 0.2 millimeters (mm) to about 0.7 mm, from about 0.3 mm to about 0.5 mm, or from about 0.375 millimeters to about 0.5 millimeters in diameter. In some arrangements, the wire(s) can have a stiffness of up to about 70 gigapascals. The pulling force of SMA wire(s) can be from about 150 MPA to about 400 MPa. The wire(s) can be configured to provide an initial moment of from about 300 to about 600 N·mm, or greater than about 500 N·mm, where the unit of newton millimeter (N·mm) is a unit of torque (also called moment) in the SI system. One newton meter is equal to the torque resulting from a force of one newton applied perpendicularly to the end of a moment arm that is one meter long. In various aspects, the wire(s) can be configured to transform in phase, causing the shape memory material members 180 to be moved from non-activated position to an activated position in about 3 seconds or less, about 2 seconds or less, about 1 second or less, or about 0.5 second or less.

The wire(s) can be made of any suitable shape memory material, now known or later developed. Different materials can be used to achieve various balances, characteristics, properties, and/or qualities. As an example, an SMA wire can include nickel-titanium (Ni—Ti, or nitinol). One example of a nickel-titanium shape memory alloy is FLEXINOL, which is available from Dynaolloy, Inc., Irvine, California. As further example, the SMA wires can be made of Cu—Al—Ni, Fe—Mn—Si, or Cu—Zn—Al.

The SMA wire can be configured to increase or decrease in length upon changing phase, for example, by being heated to a phase transition temperature $T_{SMA}$. Utilization of the intrinsic property of SMA wires can be accomplished by using heat, for example, via the passing of an electric current through the SMA wire in order provide heat generated by electrical resistance, in order to change a phase or crystal structure transformation (i.e., twinned martensite, detwinned martensite, and austenite) resulting in a lengthening or shortening the SMA wire. In some implementations, during the phase change, the SMA wire can experience a decrease in length of from about 2 to about 8 percent, or from about 3 percent to about 6 percent, and in certain aspects, about 3.5 percent, when heated from a temperature less than the $T_{SMA}$ to a temperature greater than the $T_{SMA}$.

Other active materials may be used in connection with the arrangements described herein. For example, other shape memory materials may be employed. Shape memory materials, a class of active materials, also sometimes referred to as smart materials, include materials or compositions that have the ability to remember their original shape, which can subsequently be recalled by applying an external stimulus, such as an activation signal.

While the shape memory material members 180 are described, in some implementations, as being wires, it will be understood that the shape memory material members 180 are not limited to being wires. Indeed, it is envisioned that suitable shape memory materials may be employed in a variety of other forms, such as sheets, plates, panels, strips, cables, tubes, or combinations thereof. In some arrangements, the shape memory material members 180 may include an insulating coating. Further, it will be appreciated that the contracting member(s) 175 are not limited to being shape memory material member(s) 180.

The actuator 100 can include a clutch. In one or more arrangements, the actuator 100 can include an electrostatic clutch 190. The electrostatic clutch 190 can be any type of electrostatic clutch, now known or later developed. Some examples of an electrostatic clutch are described in U.S. Patent Publ. No. 2021/0265922 and U.S. Pat. No. 10,355,624, which are incorporated herein by reference. One non-limiting example of the electrostatic clutch 190 is shown in FIGS. 1-6.

The electrostatic clutch 190 can include a first electrode 192 and a second electrode 194. The first electrode 192 and the second electrode 194 can be made of any suitable material. For instance, the first electrode 192 and the second electrode 194 can include a conductive material. In some arrangements, the first electrode 192 and the second electrode 194 can include a plurality of layers. As a non-limiting example, the first electrode 192 and/or the second electrode 194 can include three layers. For instance, the first electrode 192 and/or the second electrode 194 can include a base layer, which can be polyester, other polymer, composite, etc. A metallic layer can be coated or otherwise applied on the base layer. In some arrangements, the metallic layer can include aluminum or other conductor. A dielectric layer can be coated on top of the metallic layer. Thus, the metallic layer can be located between the base layer and the dielectric layer. The dielectric layer can be made of any suitable dielectric material. In one or more arrangements, the dielectric layer can be made of a high dielectric polymer (e.g., a minimum dielectric constant of at least 20).

The first electrode 192 and the second electrode 194 can be made of a flexible material and/or a conforming material. As will be described herein, the first electrode 192 and the second electrode 194 can move when the electrostatic clutch 190 is activated. Also, when the electrostatic clutch 190 is activated, the first electrode 192 and the second electrode 194 can conform to each other so that there is a good interface between them.

The first electrode 192 and the second electrode 194 can have any suitable size, shape, and/or configuration. In one or more arrangements, the first electrode 192 and the second electrode 194 can be substantially rectangular. In some arrangements, the first electrode 192 and the second electrode 194 can be substantially identical to each other. In other arrangements, the first electrode 192 and the second electrode 194 can be different from each other in one or more respects.

The first electrode 192 can be operatively connected to the first endcap 110. More particularly, the first electrode 192 can be operatively connected to the middle prong 114 of the first endcap 110. The first electrode 192 can be operatively connected to the first endcap 110 in any suitable manner, now known or later developed. For instance, the first electrode 192 can be operatively connected to the first endcap 110 by one or more fasteners, one or more adhesives, one or more welds, one or more brazes, one or more forms of mechanical engagement, and/or any combination thereof, just to name a few possibilities. The first electrode 192 can extend from the first endcap 110 in a direction toward the second endcap 120. The first electrode 192 can extend cantilevered from the first endcap 110.

The second electrode 194 can be operatively connected to the second endcap 120. More particularly, the second electrode 194 can be operatively connected to the middle prong 124 of the second endcap 120. The second electrode 194 can be operatively connected to the second endcap 120 in any suitable manner, now known or later developed. For instance, the second electrode 194 can be operatively connected to the second endcap 120 by one or more fasteners, one or more adhesives, one or more welds, one or more brazes, one or more forms of mechanical engagement, and/or any combination thereof, just to name a few possibilities. The second electrode 194 can extend from the second endcap 120 in a direction toward the first endcap 110. The second electrode 194 can extend cantilevered from the second endcap 120.

In some arrangements, the first electrode 192 and the second electrode 194 can be substantially parallel to each other. In some arrangements, the first electrode 192 and the second electrode 194 are configured to move relative to each other. For instance, the first electrode 192 and the second electrode 194 are configured to slide relative to each other. As an example, when the actuator 100 is in a non-activated condition, the first electrode 192 and the second electrode 194 can overlap each other in a first area 196. When the actuator 100 is in an activated condition or in the maintained activated condition, the first electrode 192 and the second electrode 194 can overlap each other in a second area 198. The second area 198 can be greater than the first area 196. Thus, the amount of overlap between the first electrode 192 and the second electrode 194 can increase when going from the non-activated condition to the activated condition.

In some arrangements, the overlapping portions of the first electrode 192 and the second electrode 194 can be adjacent to each other. The overlapping portions of the first electrode 192 and the second electrode 194 can contact each other. In some arrangements, the overlapping portions of the first electrode 192 and the second electrode 194 can be spaced from each other in an elevational direction. The spacing can be small, such as about 0.25 inches or less, about 0.125 inches or less, about 0.0625 inches or less, or even smaller.

The electrostatic clutch 190 can be activated by supplying electrical energy to the first electrode 192 and the second electrode 194. The first electrode 192 and the second electrode 194 can become oppositely charged. The first electrode 192 and the second electrode 194 can become electrostatically attracted to each other. Given their close proximity, the overlapping surfaces of the first electrode 192 and the second electrode 194 can become connected to each other due to the electrostatic forces. As a result, the first electrode 192 and the second electrode 194 do not move relative to each other. It will be appreciated that, the larger the area of overlap between the first electrode 192 and the second electrode 194, the higher the electrostatic holding force between them.

There can be any suitable arrangement between the electrostatic clutch 190 and the shape memory material member(s) 180. For instance, the electrostatic clutch 190 and the shape memory material member(s) 180 can be substantially parallel to each other. In some arrangements, the electrostatic clutch 190 and the shape memory material member(s) 180 can be located substantially within the same plane or at substantially the same elevation. In some arrangements, the electrostatic clutch 190 and the shape memory material member(s) 180 can be arranged in different planes. In some arrangements, there can be a plurality of electrostatic clutches 190. In one or more arrangements, there can be two electrostatic clutches 190, as shown in FIGS. 1-6. The two electrostatic clutches 190 can be located in substantially the same plane as the shape memory material member(s) 180 or at substantially the same elevation. Moreover, the two electrostatic clutches 190 can be located on opposite outboard sides of the shape memory material member(s) 180. However, it will be appreciated that arrangements described herein are not limited to such a configuration.

The actuator 100 can include a first dimension 200 and the second dimension 210. The first dimension 200 can describe a width of the actuator 100, and the second dimension 210 can describe a height of the actuator 100. The first dimension 200 and the second dimension 210 can be substantially perpendicular to each other.

Various operational configurations of the actuator 100 will now be described. These operational configurations include a non-activated condition, an activated condition, and a maintained activated condition.

FIGS. 1 and 4 show an example of the actuator 100 in a non-activated condition. Here, neither the shape memory material member(s) 180 nor the electrostatic clutch 190 are activated. The first electrode 192 and the second electrode 194 of each electrostatic clutch 190 can partially overlap each other, as shown. The shape memory material member(s) 180 can be taut or slightly slack.

Figure 2:
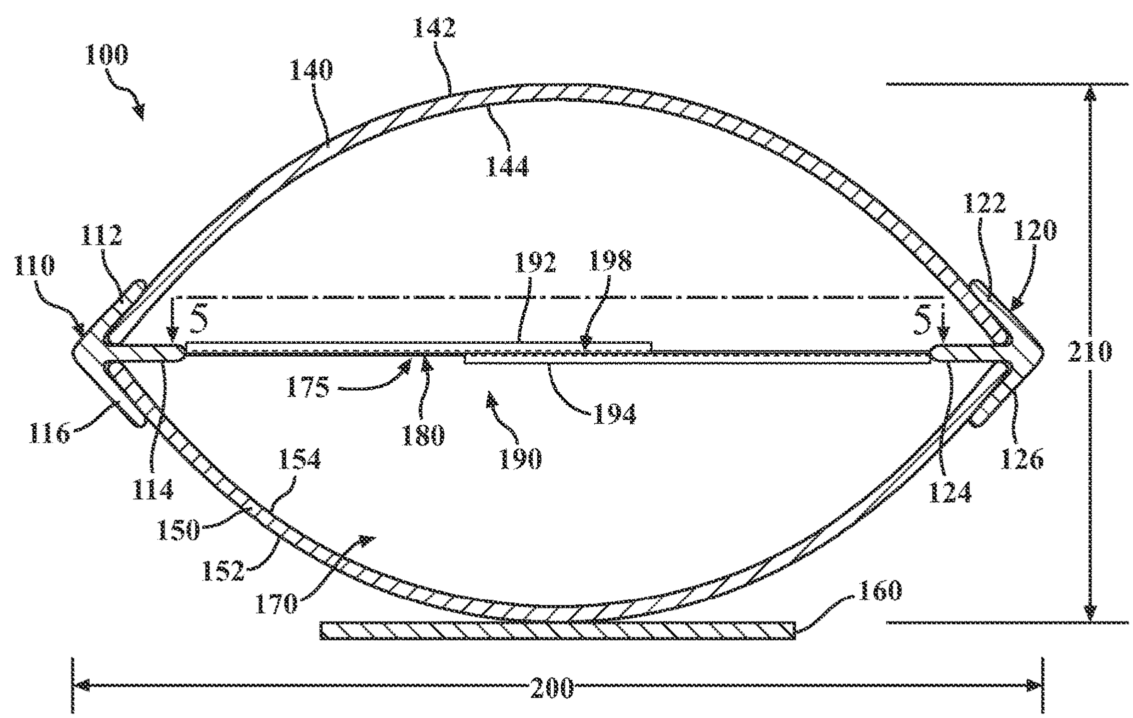
FIG. 2 is a cross-sectional view of the actuator of FIG. 1, showing an activated condition.

FIGS. 2 and 5 show an example of the actuator 100 in an activated condition. When an activation input (e.g., electrical energy) is provided to the shape memory material member(s) 180, the shape memory material member(s) 180 can contract. This contraction causes the shape memory material member(s) 180 to pull the first endcap 110 and the second endcap 120 toward each other in a direction that corresponds to the first dimension 200.

Consequently, the ends of the first outer member 140 can be drawn toward each other in a direction that corresponds to the first dimension 200, and the ends of the second outer member 150 can be drawn toward each other in a direction that corresponds to the first dimension 200. As a result, the first outer member 140 and the second outer member 150 can bow outward and away from each other in a direction that corresponds to the second dimension 210. It will be appreciated that, in going from the non-activated condition to the activated condition, the first dimension 200 (i.e., the width) of the actuator 100 can decrease, and the second dimension 210 (i.e., the height) of the actuator 100 can increase. Further, the first electrode 192 can be moved toward the second endcap 120, and the second electrode 194 can be moved toward the first endcap 110. As a result, the amount of overlap between the first electrode 192 and the second electrode 194 can increase.

FIGS. 3 and 6 show an example of the actuator 100 in a maintained activated condition. The electrostatic clutch 190 can be activated, such as by supplying electrical energy to the first electrode 192 and the second electrode 194. As a result, the first electrode 192 and the second electrode 194 can become electrostatically connected to each other.

After the electrostatic clutch 190 is activated, the activation input to the shape memory material member(s) 180 can be discontinued. Thus, the supply of electrical energy to the shape memory material member(s) 180 can be stopped. The shape memory material member(s) 180 can begin to cool and will expand. However, the activated condition of the actuator 100 can be maintained due to the electrostatic connection between the first electrode 192 and the second electrode 194. The electrostatic connection is sufficiently strong to prevent the first electrode 192 and the second electrode 194 from sliding relative to each other and sufficiently strong to maintain the actuator 100 in the activated condition.

It should be noted that while the actuator 100 is in the activated condition and the shape memory material member(s) 180 expand, the shape memory material member(s) 180 may no longer retain a substantially linear configuration. The shape memory material member(s) 180 can become slack and/or warped, as kinks, bens, curves, etc. may develop.

The first electrode 192 and the second electrode 194 can be disengaged to cause the actuator 100 to return to the non-activated configuration. Such disengagement can be achieved in any suitable manner. For instance, the electrostatic clutch 190 can be deactivated, such as by discontinuing the supply of electrical energy to the first electrode 192 and the second electrode 194.

It will be appreciated that the actuator 100 shown in FIGS. 1-6 is merely one example of an actuator that can be used in connection with arrangements described herein. Other actuator configurations are possible. Additional non-limiting examples of actuators with contracting members are described in U.S. Pat. Nos. 10,960,793; 11,285,844; 11,370,330; and 11,091,060, which are incorporated herein by reference. Still further actuators are described in U.S. patents application Ser. Nos. 18/329,217 and 18/399,026, which are incorporated herein by reference.

It will be further appreciated that the actuator 100 is not limited to having an electrostatic clutch 190. Indeed, the actuator 100 can have any suitable type of clutch, now known or later developed, that can maintain the actuator 100 in the activated configuration when the activation input to the one or more contracting members is discontinued. Additional examples of suitable clutches will now be described.

Figure 11:
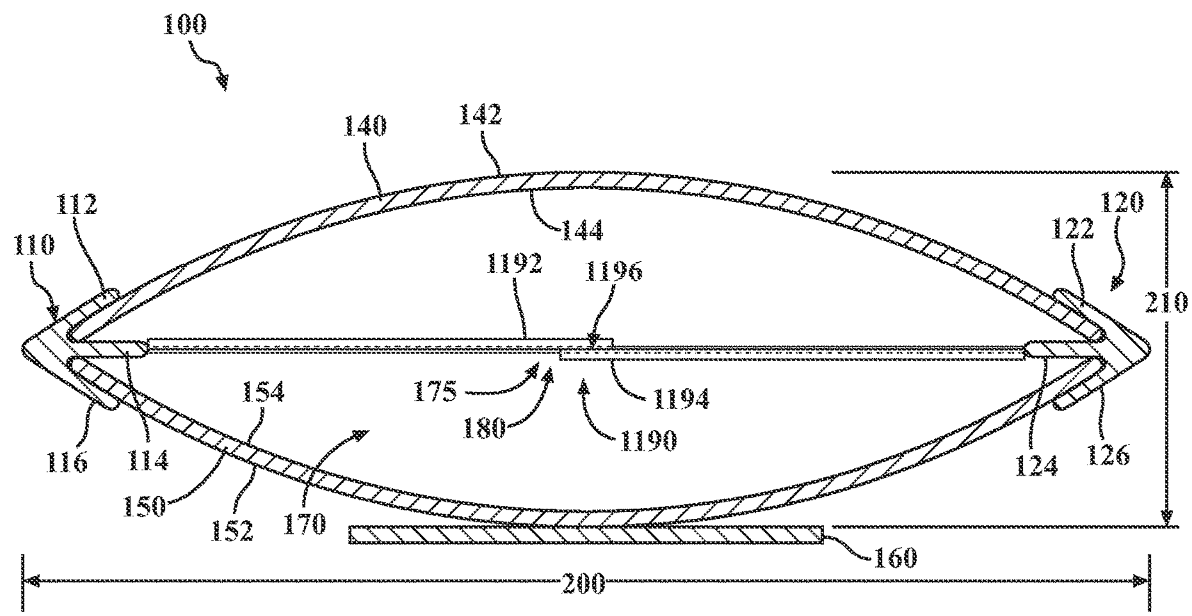
FIG. 11 is a cross-sectional view of an example of an actuator with a magnetic clutch, showing a non-activated condition.
Figure 12:
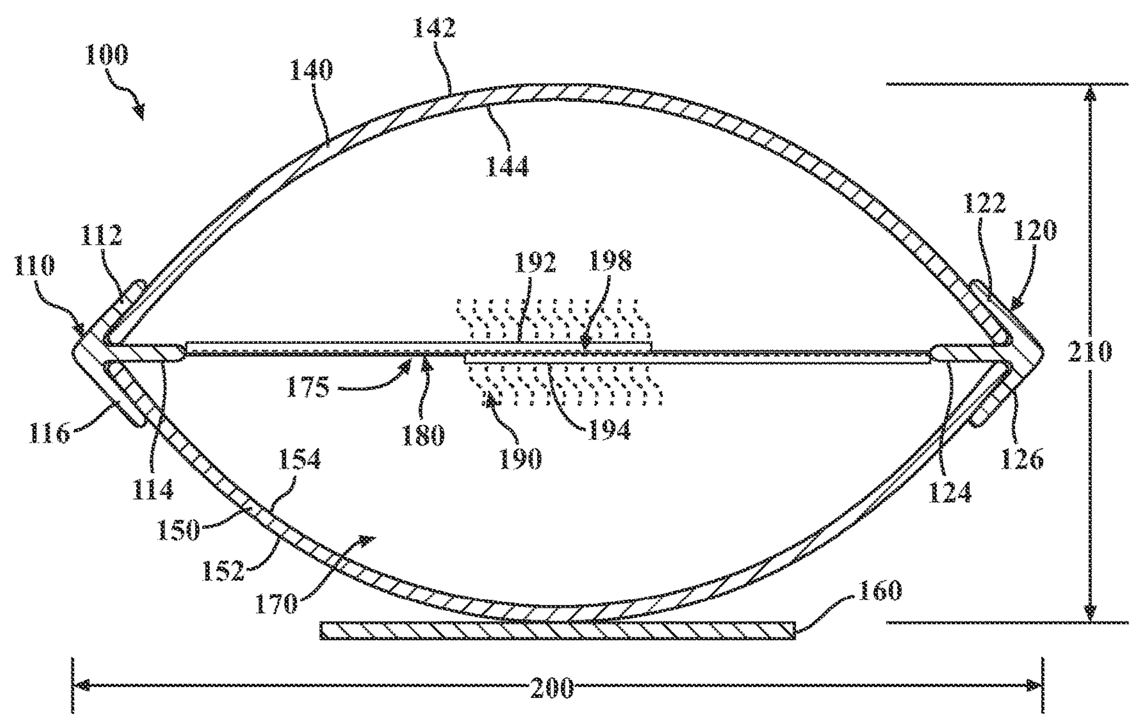
FIG. 12 is a cross-sectional view of the actuator of FIG. 11, showing an activated condition.
Figure 13:
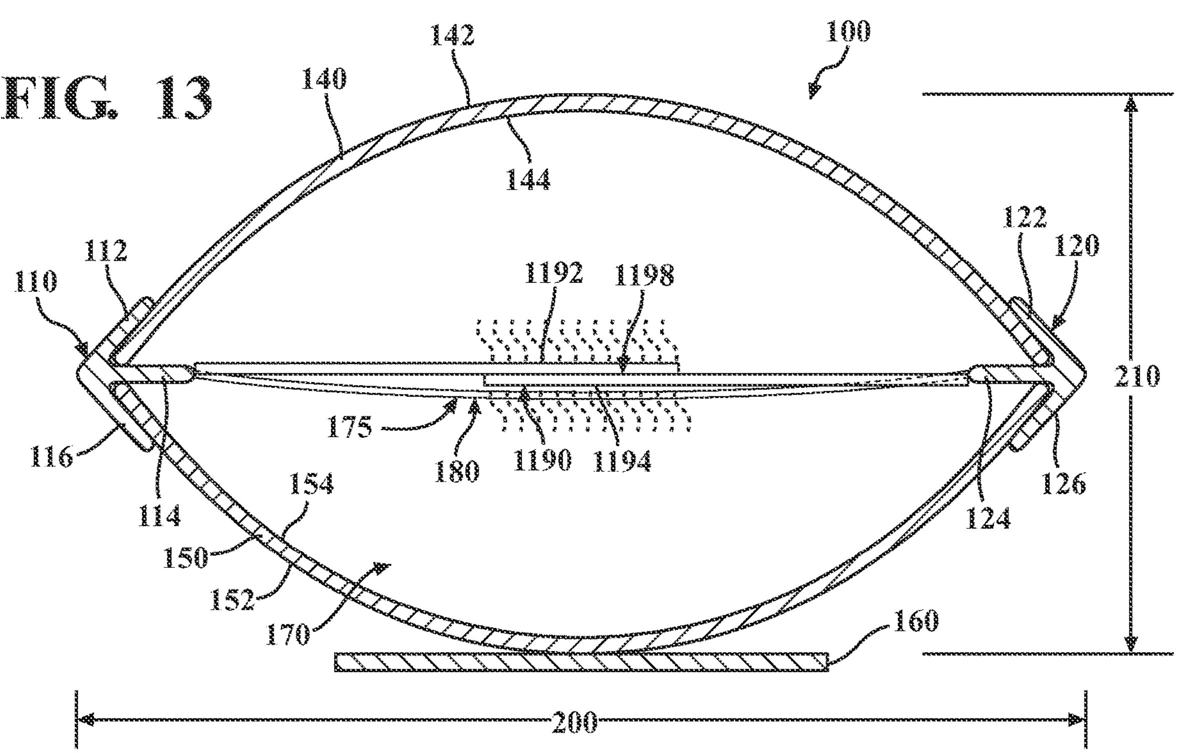
FIG. 13 is a cross-sectional view of the actuator of FIG. 1, showing a maintained activated condition.

Referring to FIGS. 11-13, another example of an actuator 100 is shown. The actuator 100 can include one or more actuator body members (e.g., a first outer member 140 and/or a second outer member 150), one or more endcaps (e.g., a first endcap 110 and/or a second endcap 120), and one or more contracting members 175. The above description of these and other structures of the actuator 100 in connection with FIGS. 1-6 applies equally to the actuator 100 in FIGS. 11-13. For convenience, the reference numbers for the actuator 100 and its various components presented in connection with FIGS. 1-6 will be repeated here in connection with FIGS. 11-13.

The actuator 100 can have a clutch. The clutch can be a magnetic clutch 1190. The magnetic clutch 1190 can include a first clutch element 1192 and a second clutch element 1194. The first clutch element 1192 and the second clutch element 1194 can be configured such that, when activated, they magnetically attract each other.

The first clutch element 1192 and the second clutch element 1194 can be made of any suitable material that can produce a magnetic field. For instance, the first clutch element 1192 and the second clutch element 1194 can include a ferromagnetic material. In some arrangements, the first clutch element 1192 and/or the second clutch element 1194 can be made entirely of a magnetic material. In other arrangements, the first clutch element 1192 and/or the second clutch element 1194 can be made of any suitable material to which a magnet is attached. In some arrangements, the first clutch element 1192 and the second clutch element 1194 can be electromagnets.

In some arrangements, the first clutch element 1192 and the second clutch element 1194 can be made of a flexible material and/or a conforming material. As will be described herein, the first clutch element 1192 and the second clutch element 1194 can move when the magnetic clutch 1190 is activated. Also, when the magnetic clutch 1190 is activated, the first clutch element 1192 and the second clutch element 1194 can conform to each other so that there is a good interface between them.

The first clutch element 1192 and the second clutch element 1194 can have any suitable size, shape, and/or configuration. In one or more arrangements, the first clutch element 1192 and the second clutch element 1194 can be substantially rectangular. In some arrangements, the first clutch element 1192 and the second clutch element 1194 can be substantially identical to each other. In other arrangements, the first clutch element 1192 and the second clutch element 1194 can be different from each other in one or more respects.

In some arrangements, the first clutch element 1192 can be operatively connected to the first endcap 110, and the second clutch element 1194 can be operatively connected to the second endcap 120. The discussion of the operative connection between the first electrode 192 and the first endcap 110 as well as the operative connection between the second electrode 194 and the second endcap 120 in connection with FIGS. 1-6 applies equally to FIGS. 11-13.

In some arrangements, the first clutch element 1192 and the second clutch element 1194 can be substantially parallel to each other. In some arrangements, the first clutch element 1192 and the second clutch element 1194 are configured to move relative to each other. For instance, the first clutch element 1192 and the second clutch element 1194 are configured to slide relative to each other.

In some arrangements, when the actuator 100 is in a non-activated condition, the first clutch element 1192 and the second clutch element 1194 can overlap each other in a first area 1196. When the actuator 100 is in an activated condition or in the maintained activated condition, the first clutch element 1192 and the second clutch element 1194 can overlap each other in a second area 1198. The second area 1198 can be greater than the first area 1196. Thus, the amount of overlap between the first clutch element 1192 and the second clutch element 1194 can increase when going from the non-activated condition to the activated condition.

In some arrangements, the overlapping portions of the first clutch element 1192 and the second clutch element 1194 can be adjacent to each other. The overlapping portions of the first clutch element 1192 and the second clutch element 1194 can contact each other. In some arrangements, the overlapping portions of the first clutch element 1192 and the second clutch element 1194 can be spaced from each other in an elevational direction. The spacing can be small, such as about 0.25 inches or less, about 0.125 inches or less, about 0.0625 inches or less, or even smaller.

In some arrangements, the magnetic clutch 1190 can be activated by the proximity of the first clutch element 1192 and the second clutch element 1194. When sufficiently close, the first clutch element 1192 and the second clutch element 1194 can magnetically attract each other.

In other arrangements, the magnetic clutch 1190 can be activated by supplying energy to the first clutch element 1192 and the second clutch element 1194. The first clutch element 1192 and the second clutch element 1194 can produce magnetic fields. The first electrode 192 and the second electrode 194 can become magnetically attracted to each other. Given their close proximity, the overlapping surfaces of the first electrode 192 and the second electrode 194 can become connected to each other due to the magnetic forces. As a result, the first electrode 192 and the second electrode 194 do not move relative to each other.

There can be any suitable arrangement between the magnetic clutch 1190 and the shape memory material member(s) 180. The above discussion in connection with FIGS. 1-6 in this regard applies equally to FIGS. 11-13.

Various operational configurations of the actuator 100 in FIGS. 11-13 will now be described. These operational configurations include a non-activated condition, an activated condition, and a maintained activated condition.

FIG. 11 shows an example of the actuator 100 in a non-activated condition. Here, neither the shape memory material member(s) 180 nor the magnetic clutch 1190 are activated. The first clutch element 1192 and the second clutch element 1194 of the magnetic clutch 1190 can partially overlap each other, as shown. The shape memory material member(s) 180 can be taut or slightly slack.

FIG. 12 shows an example of the actuator 100 in an activated condition. When an activation input (e.g., electrical energy) is provided to the shape memory material member(s) 180, the shape memory material member(s) 180 can contract. This contraction causes the shape memory material member(s) 180 to pull the first endcap 110 and the second endcap 120 toward each other in a direction that corresponds to the first dimension 200.

Consequently, the ends of the first outer member 140 can be drawn toward each other in a direction that corresponds to the first dimension 200, and the ends of the second outer member 150 can be drawn toward each other in a direction that corresponds to the first dimension 200. As a result, the first outer member 140 and the second outer member 150 can bow outward and away from each other in a direction that corresponds to the second dimension 210. It will be appreciated that, in going from the non-activated condition to the activated condition, the first dimension 200 (i.e., the width) of the actuator 100 can decrease, and the second dimension 210 (i.e., the height) of the actuator 100 can increase. Further, the first clutch element 1192 can be moved toward the second endcap 120, and the second clutch element 1194 can be moved toward the first endcap 110. As a result, the amount of overlap between the first clutch element 1192 and the second clutch element 1194 can increase.

FIG. 13 shows an example of the actuator 100 in a maintained activated condition. The magnetic clutch 1190 can be activated, such as by supplying electrical energy to the first clutch element 1192 and the second clutch element 1194. As a result, the first clutch element 1192 and the second clutch element 1194 can become magnetically attracted to each other. The first clutch element 1192 and the second clutch element 1194 can become operatively connected to each other.

After the magnetic clutch 1190 is activated, the activation input to the shape memory material member(s) 180 can be discontinued. Thus, the supply of energy to the shape memory material member(s) 180 can be stopped. The shape memory material member(s) 180 can begin to cool and will expand. However, the activated condition of the actuator 100 can be maintained due to the magnetic connection between the first clutch element 1192 and the second clutch element 1194. The magnetic connection can be sufficiently strong to prevent the first clutch element 1192 and the second clutch element 1194 from sliding or moving relative to each other and sufficiently strong to maintain the actuator 100 in the activated condition.

It will be appreciated that the arrangements shown in FIGS. 4-6 also apply to the arrangements of FIGS. 11-13.

It should be noted that while the actuator 100 is in the activated condition and the shape memory material member(s) 180 expand, the shape memory material member(s) 180 may no longer retain a substantially linear configuration. The shape memory material member(s) 180 can become slack and/or warped, as kinks, bens, curves, etc. may develop.

The first clutch element 1192 and the second clutch element 1194 can be disengaged to cause the actuator 100 to return to the non-activated configuration. Such disengagement can be achieved in any suitable manner. For instance, the first clutch element 1192 and the second clutch element 1194 can be disengaged by discontinuing the supply of electrical energy to the first clutch element 1192 and the second clutch element 1194 or by otherwise causing the magnetic fields produced by the first clutch element 1192 and/or the second clutch element 1194 to cease.

Figure 14:
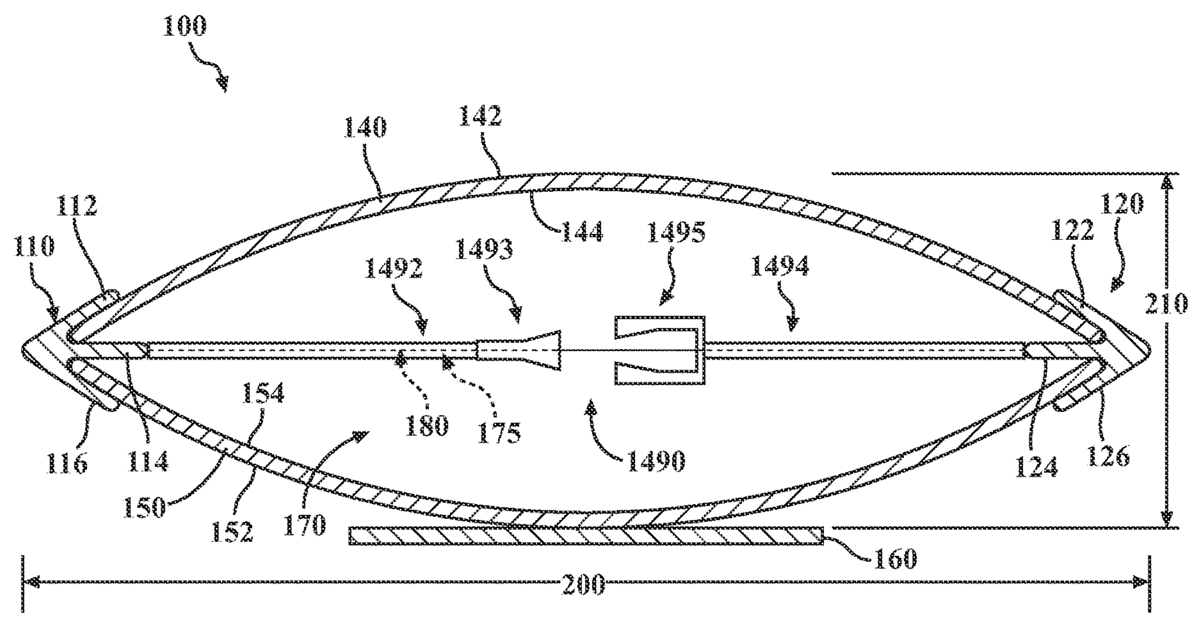
FIG. 14 is a cross-sectional view of an example of an actuator with a mechanical clutch, showing a non-activated condition.
Figure 15:
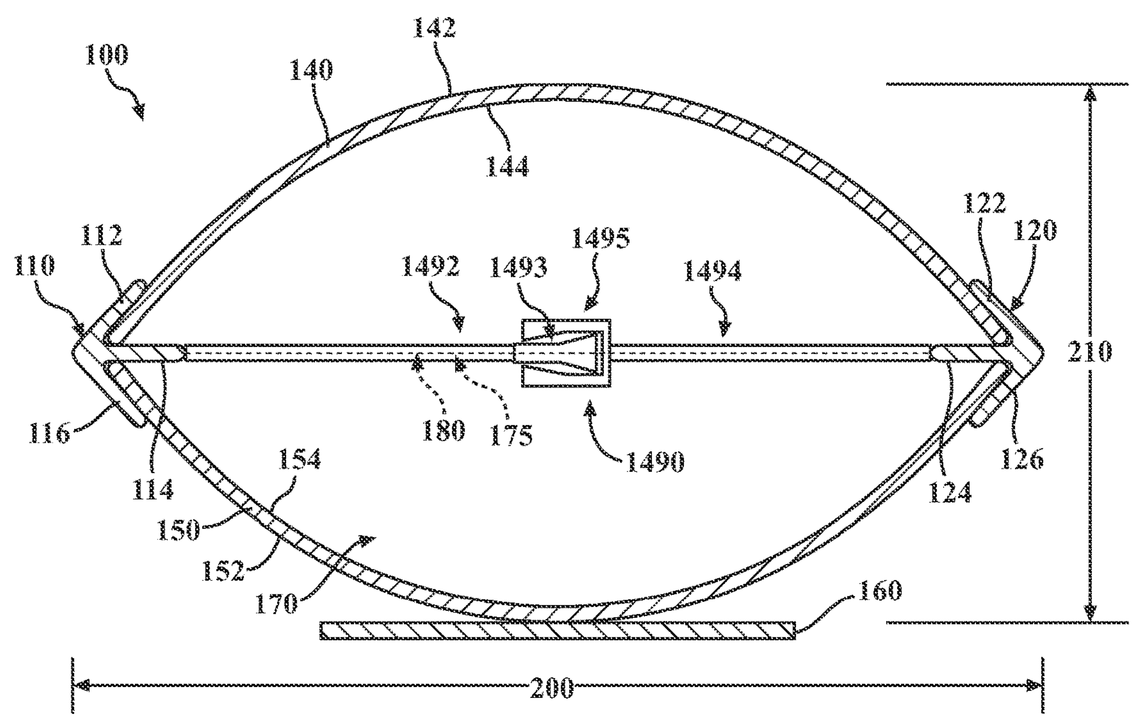
FIG. 15 is a cross-sectional view of the actuator of FIG. 14, showing an activated condition.
Figure 16:
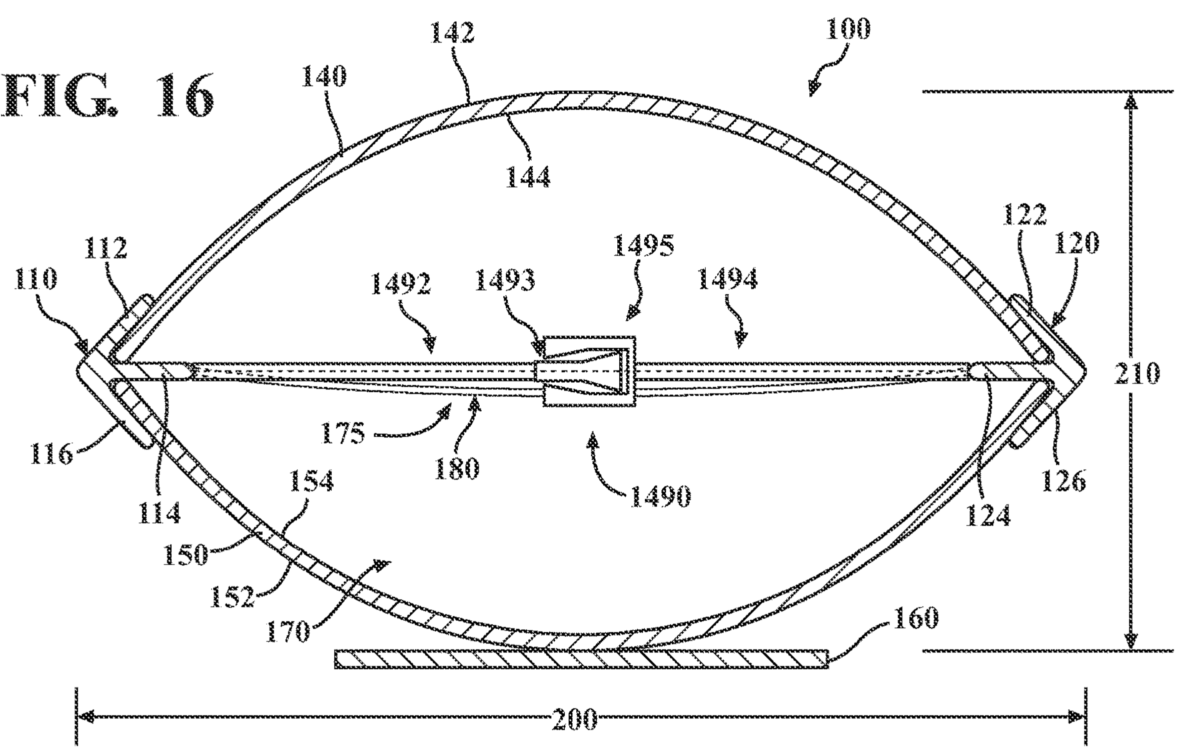
FIG. 16 is a cross-sectional view of the actuator of FIG. 4, showing a maintained activated condition.

Referring to FIGS. 14-16, still another example of an actuator 100 is shown. The actuator 100 can include one or more actuator body members (e.g., a first outer member 140 and/or a second outer member 150), one or more endcaps (e.g., a first endcap 110 and/or a second endcap 120), and one or more contracting members 175. The above description of these and other structures of the actuator 100 in connection with FIGS. 1-6 applies equally to the actuator 100 in FIGS. 14-16. For convenience, the reference numbers for the actuator 100 and its various components presented in connection with FIGS. 1-6 will be repeated here in connection with FIGS. 14-16.

The actuator 100 can have a clutch. The clutch can be a mechanical clutch 1490. The mechanical clutch 1490 can include one or more mechanical components configured to maintain the actuator 100 in an activated configuration. The mechanical clutch 1490 may include one or more electrical components. Thus, the mechanical clutch 1490 can include entirely mechanical clutches as well as electromechanical clutches. In some arrangements, the mechanical clutch 1490 can maintain the actuator 100 in an activated configuration by a physical connection or a physical structure.

In one or more arrangements, the mechanical clutch 1490 can use mechanical engagement, such as interlocking engagement. In such case, the mechanical clutch 1490 can include a first clutch element 1492 and a second clutch element 1494. The first clutch element 1492 and the second clutch element 1494 can be configured such that, when the actuator 100 morphs into the activated configuration, the first clutch element 1492 and the second clutch element 1494 can be brought together such that they interlockingly engage or otherwise retainably engage each other. The interlocking engagement of the first clutch element 1492 and the second clutch element 1494 can maintain the actuator 100 in the activated configuration, even after the supply of energy to the contracting member(s) is discontinued.

The first clutch element 1492 can include a first engaging end 1493. The second clutch element 1494 can include a second engaging end 1495. The first engaging end 1493 and the second engaging end 1495 can be configured for interlocking or other retaining engagement. The first engaging end 1493 and the second engaging end 1495 can have any suitable size, shape, and/or configuration. In one or more arrangements, the first engaging end 1493 can be configured to be received within the second engaging end 1495.

In some arrangements, the first clutch element 1492 can be operatively connected to the first endcap 110, and the second clutch element 1494 can be operatively connected to the second endcap 120. The discussion of the operative connection between the first electrode 192 and the first endcap 110 as well as the operative connection between the second electrode 194 and the second endcap 120 in connection with FIGS. 1-6 applies equally to FIGS. 14-16.

In some arrangements, the first clutch element 1492 and the second clutch element 1494 can be substantially parallel to each other. In some arrangements, the first clutch element 1492 and the second clutch element 1494 are configured to move relative to each other. For instance, the first clutch element 1492 and the second clutch element 1494 are configured to slide relative to each other.

In some arrangements, when the actuator 100 is in a non-activated condition, the first engaging end 1493 and the second engaging end 1495 can be spaced from each other. The first engaging end 1493 and the second engaging end 1495 can be operatively aligned with each other such that, when the actuator 100 morphs into the activated configuration, the first engaging end 1493 and the second engaging end 1495 are brought into contact with each other. Thus, the mechanical clutch 1490 can be activated by the engagement between the first engaging end 1493 and the second engaging end 1495.

There can be any suitable arrangement between the mechanical clutch 1490 and the shape memory material member(s) 180. The above discussion in connection with FIGS. 1-6 in this regard applies equally to FIGS. 14-16.

Various operational configurations of the actuator 100 in FIGS. 14-16 will now be described. These operational configurations include a non-activated condition, an activated condition, and a maintained activated condition.

FIG. 14 shows an example of the actuator 100 in a non-activated condition. Here, neither the shape memory material member(s) 180 nor the mechanical clutch 1490 are activated. The first engaging end 1493 and the second engaging end 1495 of the mechanical clutch 1490 can be spaced from each other, as shown. However, in some arrangements, the first engaging end 1493 and the second engaging end 1495 of the mechanical clutch 1490 can be adjacent to each other. The shape memory material member(s) 180 can be taut or slightly slack.

FIG. 15 shows an example of the actuator 100 in an activated condition. When an activation input (e.g., electrical energy) is provided to the shape memory material member(s) 180, the shape memory material member(s) 180 can contract. This contraction causes the shape memory material member(s) 180 to pull the first endcap 110 and the second endcap 120 toward each other in a direction that corresponds to the first dimension 200.

As a result, the first outer member 140 and the second outer member 150 can bow outward and away from each other in a direction that corresponds to the second dimension 210. It will be appreciated that, in going from the non-activated condition to the activated condition, the first dimension 200 (i.e., the width) of the actuator 100 can decrease, and the second dimension 210 (i.e., the height) of the actuator 100 can increase.

The first engaging end 1493 and the second engaging end 1495 of the mechanical clutch 1490 can be drawn toward each other in a direction that corresponds to the first dimension 200. The first engaging end 1493 and the second engaging end 1495 can interlockingly engage each other. For instance, the first engaging end 1493 can be received within the second engaging end 1495.

FIG. 16 shows an example of the actuator 100 in a maintained activated condition. The mechanical clutch 1490 is activated in that the first engaging end 1493 and the second engaging end 1495 are interlockingly engaged with each other. The activation input to the shape memory material member(s) 180 can be discontinued. Thus, the supply of energy to the shape memory material member(s) 180 can be stopped. The shape memory material member(s) 180 can begin to cool and will expand. However, the activated condition of the actuator 100 can be maintained due to the interlocking engagement between the first engaging end 1493 and the second engaging end 1495. The mechanical engagement can be sufficiently strong to prevent the first engaging end 1493 and the second engaging end 1495 from sliding or moving relative to each other and sufficiently strong to maintain the actuator 100 in the activated condition.

It will be appreciated that the arrangements shown in FIGS. 4-6 also apply to the arrangements of FIGS. 14-16.

It should be noted that while the actuator 100 is in the activated condition and the shape memory material member(s) 180 expand, the shape memory material member(s) 180 may no longer retain a substantially linear configuration. The shape memory material member(s) 180 can become slack and/or warped, as kinks, bens, curves, etc. may develop.

The first engaging end 1493 and the second engaging end 1495 can be disengaged to cause the actuator 100 to return to the non-activated configuration. Such disengagement can be achieved in any suitable manner. For instance, the first engaging end 1493 and the second engaging end 1495 can be disengaged by causing the first engaging end 1493 and/or the second engaging end 1495 to morph or move. To that end, the first engaging end 1493 and/or the second engaging end 1495 can be at least partially made of or at least partially include an electroactive material. In such case, the electroactive material can be activated to cause the first engaging end 1493 and/or the second engaging end 1495 to morph or move, which can facilitate the separation of the first engaging end 1493 and the second engaging end 1495. Such a feature can also be used to facilitate the interlocking engagement between the first engaging end 1493 and the second engaging end 1495. For instance, the electroactive material can be activated to facilitate the first engaging end 1493 being received in the second engaging end 1495. The electroactive material can be deactivated to create the interlocking engagement. As another example, the first engaging end 1493 and/or the second engaging end 1495 can have one or more moveable elements that can facilitate the disengagement of the first engaging end 1493 and the second engaging end 1495.

As another example, the first engaging end 1493 and the second engaging end 1495 can be disengaged by another structure. For instance, a rod, bar, linkage, or other structure can physically impinge upon the first engaging end 1493 and/or the second engaging end 1495 until they separate from each other. As an example, one or more push rods can physically push on the first engaging end 1493 and/or the second engaging end 1495 to cause their separation.

Figure 17:
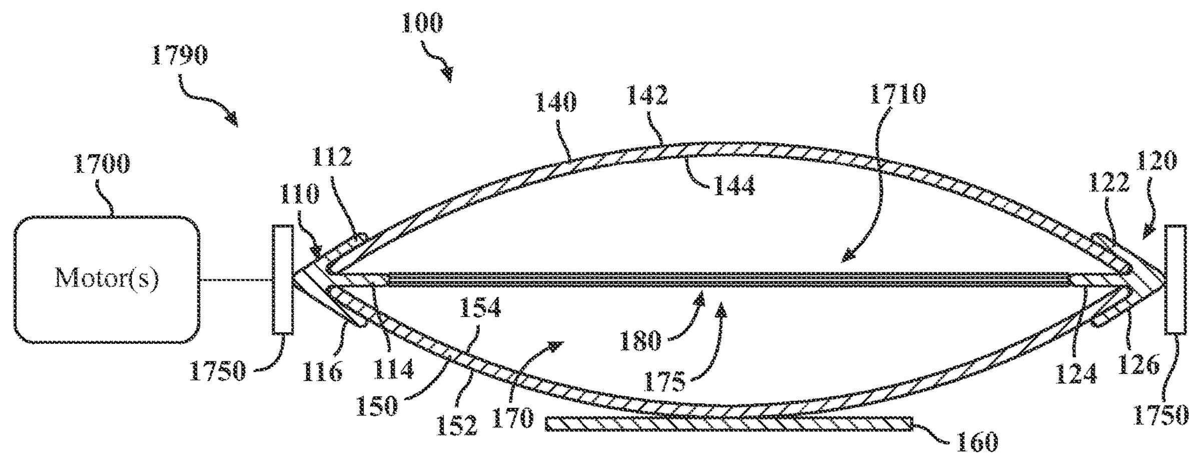
FIG. 17 is a cross-sectional view of an example of an actuator with a mechanical clutch, showing a non-activated condition.
Figure 18:
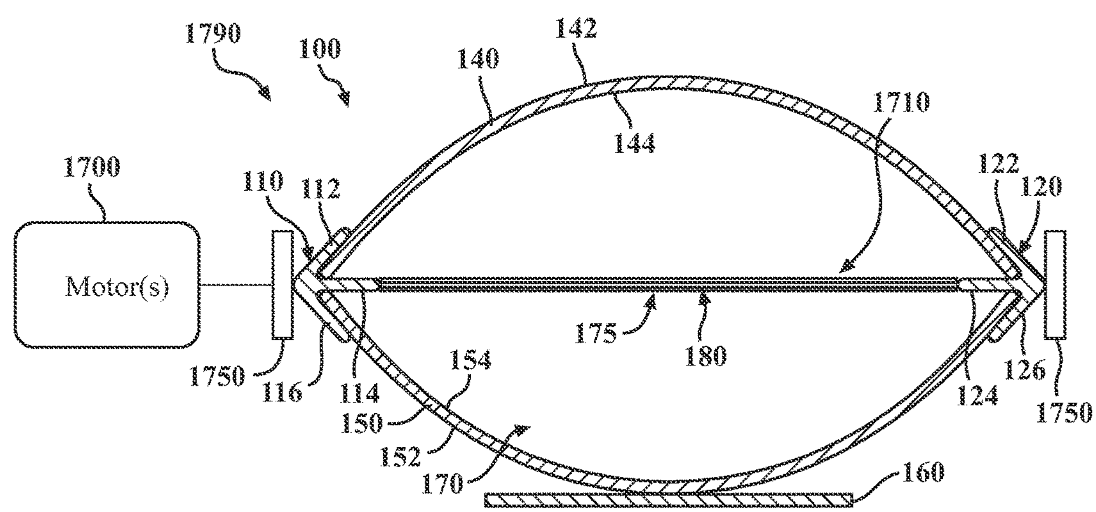
FIG. 18 is a cross-sectional view of the actuator of FIG. 17, showing an activated condition.
Figure 19:
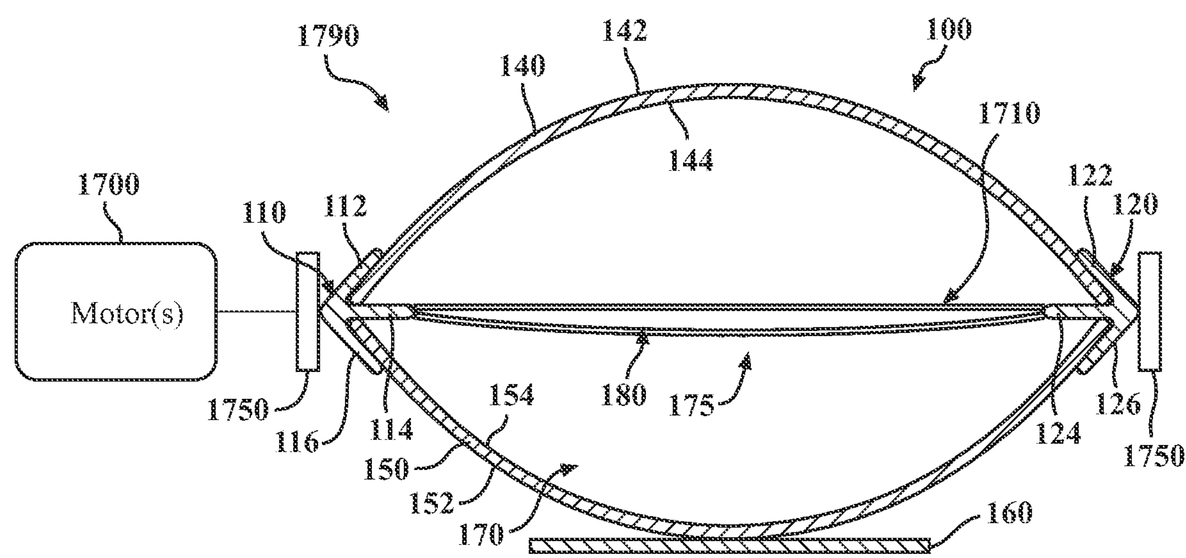
FIG. 19 is a cross-sectional view of the actuator of FIG. 17, showing a maintained activated condition.

Referring to FIGS. 17-19, another example of a clutch 1790 is shown. The clutch 1790 can include one or more motors 1700 and one or more tensioning elements 1710. The motor(s) 1700 can be operatively connected to the tensioning element(s) 1710. The clutch 1790 can be considered to be an electromechanical clutch.

The motor(s) 1700 can be any type of motor, now known or later developed. The motor(s) 7400 can be selectively activated to cause the tensioning element(s) 1710 to be tensioned. The motor(s) 1700 can be activated and deactivated responsive to receiving signals or other inputs, such as from one or more control module(s), one or more processor(s), and/or from a user.

The tensioning element(s) 1710 can be high strength rope, string, cable, tether, strap, belt, or chain. The tensioning element(s) 1710 can be operatively connected to one or more other structures to maintain the actuator 100 in the activated configuration. For example, the tensioning element(s) 1710 can be operatively connected to the first endcap 110 and the second endcap 120. Alternatively or additionally, the tensioning element(s) 1710 can be operatively connected to compressing members 1750.

The compressing members 1750 can physically squeeze the actuator 100 so as to maintain the activated configuration. The compressing members 1750 can be located laterally outboard of the first endcap 110 and the second endcap 120. In some arrangements, the compressing members 1750 can be operatively connected to a respective one of the first endcap 110 and the second endcap 120.

When the clutch 1790 is activated, the motor(s) 1700 can tension the tensioning element(s) 1710. For instance, a portion of the tensioning element(s) 1710 can wrap around a portion of the motor(s) 1700, such as an output shaft of the motor(s) 1700. When activated, the clutch 1790 can maintain the actuator 100 in the activated configuration when the activation input to the one or more contracting member(s) 175 is discontinued.

Various operational configurations of the actuator 100 in FIGS. 17-19 will now be described. These operational configurations include a non-activated condition, an activated condition, and a maintained activated condition.

FIG. 17 shows an example of the actuator 100 in a non-activated condition. Here, neither the shape memory material member(s) 180 nor the mechanical clutch 1490 are activated. The shape memory material member(s) 180 can be taut or slightly slack.

FIG. 18 shows an example of the actuator 100 in an activated condition. When an activation input (e.g., electrical energy) is provided to the shape memory material member(s) 180, the shape memory material member(s) 180 can contract. This contraction causes the shape memory material member(s) 180 to pull the first endcap 110 and the second endcap 120 toward each other in a direction that corresponds to the first dimension 200.

Consequently, the ends of the first outer member 140 can be drawn toward each other in a direction that corresponds to the first dimension 200, and the ends of the second outer member 150 can be drawn toward each other in a direction that corresponds to the first dimension 200. As a result, the first outer member 140 and the second outer member 150 can bow outward and away from each other in a direction that corresponds to the second dimension 210. It will be appreciated that, in going from the non-activated condition to the activated condition, the first dimension 200 (i.e., the width) of the actuator 100 can decrease, and the second dimension 210 (i.e., the height) of the actuator 100 can increase.

FIG. 19 shows an example of the actuator 100 in a maintained activated condition. The clutch 1790 can be activated, such as by operating the motor(s) 1700 to increase the tension in the tensioning element(s) 1710. As a result, the compressing members 1750 can be drawn toward each other. The compressing members 1750 can impart compressing forces on the actuator 100.

After the clutch 1790 is activated, the activation input to the shape memory material member(s) 180 can be discontinued. Thus, the supply of energy to the shape memory material member(s) 180 can be stopped. The shape memory material member(s) 180 can begin to cool and will expand. However, the activated condition of the actuator 100 can be maintained due to the clutch 1790. The compressing members 1750 can physically constrain the actuator 100 to remain in the activated condition. The clutch 1790 can be sufficiently strong to maintain the actuator 100 in the activated condition. The power consumption of the clutch 1790 can be less than the power consumption that would be needed to maintain the shape memory material member(s) 180 in the activated condition.

It should be noted that while the actuator 100 is in the activated condition and the shape memory material member(s) 180 expand, the shape memory material member(s) 180 may no longer retain a substantially linear configuration. The shape memory material member(s) 180 can become slack and/or warped, as kinks, bens, curves, etc. may develop.

The clutch 1790 can be deactivated to cause the actuator 100 to return to the non-activated configuration. For instance, the clutch 1790 can be deactivated by discontinuing the supply of electrical energy to the clutch 1790 or by reducing the supply of electrical energy to the clutch 1790.

Figure 7:
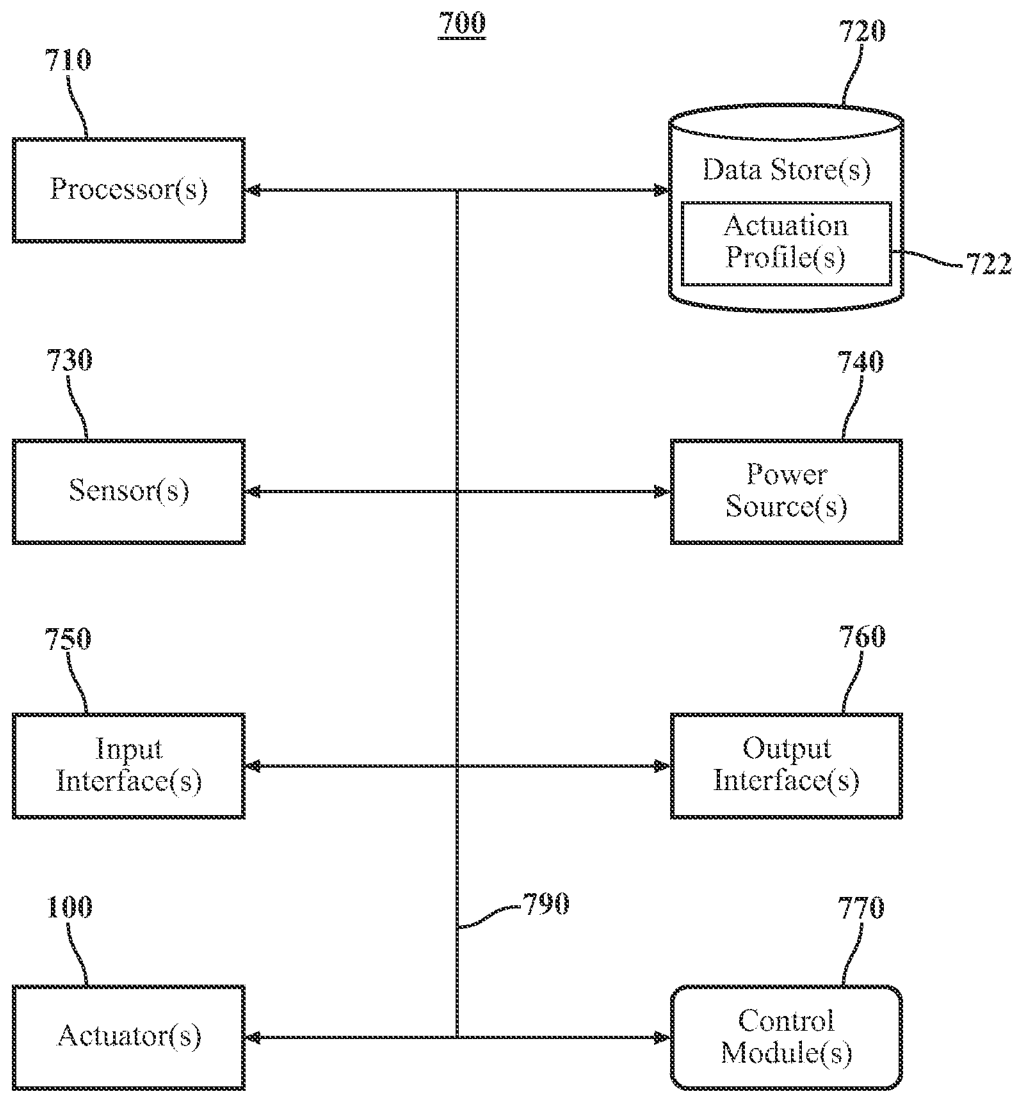
FIG. 7 is an example of an actuator system.

FIG. 7 shows an example of a system 700. The system 700 can include various elements. Some of the possible elements of the system 700 are shown in FIG. 7 and will now be described. It will be understood that it is not necessary for the system 700 to have all of the elements shown in FIG. 7 or described herein. The system 700 can have any combination of the various elements shown in FIG. 7. Further, the system 700 can have additional elements to those shown in FIG. 7. In some arrangements, the system 700 may not include one or more of the elements shown in FIG. 7. Further, while the various elements may be located on or within a chair, it will be understood that one or more of these elements can be located external to the chair. Further, the elements shown may be physically separated by large distances.

The system 700 can include one or more processors 710, one or more data stores 720, one or more sensors 730, one or more power sources 740, one or more input interfaces 750, one or more output interfaces 760, one or more of the actuators 100, and one or more control modules 770. Each of these elements will be described in turn below.

As noted above, the system 700 can include one or more processors 710. "Processor" means any component or group of components that are configured to execute any of the processes described herein or any form of instructions to carry out such processes or cause such processes to be performed. The processor(s) 710 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 710 can include at least one hardware circuit (e.g., an integrated circuit) configured to carry out instructions contained in program code. In arrangements in which there is a plurality of processors 710, such processors can work independently from each other, or one or more processors can work in combination with each other.

The system 700 can include one or more data stores 720 for storing one or more types of data. The data store(s) 720 can include volatile and/or non-volatile memory. Examples of suitable data stores 720 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 720 can be a component of the processor(s) 710, or the data store(s) 720 can be operatively connected to the processor(s) 710 for use thereby. The term "operatively connected," as used throughout this description, can include direct or indirect connections, including connections without direct physical contact.

In some arrangements, the data stores 720 can include one or more actuation profiles 722. The actuation profile(s) can be predefined patterns of activation and deactivation of one or more contracting members and the clutch of the actuators. Some examples of an actuation profile(s) are described herein.

The system 700 can include one or more sensors 730. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 700 includes a plurality of sensors 730, the sensors can work independently from each other. Alternatively, two or more of the sensors can work in combination with each other. In such case, the two or more sensors can form a sensor network. The sensor(s) 730 can be operatively connected to the processor(s) 710, the data store(s) 720, and/or other elements of the system 700 (including any of the elements shown in FIG. 7).

The sensor(s) 730 can include any suitable type of sensor, now known or later developed. In some arrangements, the sensor(s) 730 can be configured to acquire information or data about one or more of the sensors 730, an element of the system 700, a vehicle, a vehicle component (e.g., a seat), a vehicle occupant, and/or an environment (e.g., vehicle cabin environment, external environment of a vehicle, and/or other non-vehicular environment), just to name a few possibilities. In some arrangements, the sensor(s) 730 can include weight sensors. The weight sensors can be any suitable sensor, now known or later developed.

As noted above, the system 700 can include one or more power sources 740. The power source(s) 740 can be any power source capable of and/or configured to energize the contracting member(s) 175 (e.g., the shape memory material member(s) 180) and/or the clutch of the actuator 100. For example, the power source(s) 740 can include one or more batteries, one or more fuel cells, one or more generators, one or more alternators, one or more solar cells, one or more heat sources, one or more energy sources, and/or combinations thereof. In some arrangements, the power source(s) 740 can be any suitable source of electrical energy.

The system 700 can include one or more input interfaces 750. An "input interface" includes any device, component, system, element or arrangement or groups thereof that enable information/data to be entered into a machine. The input interface(s) 750 can receive an input from a user. In some arrangements, the user can be a person or a vehicle occupant (e.g., a driver or a passenger). Any suitable input interface 750 can be used, including, for example, a keypad, display, touch screen, multi-touch screen, button, joystick, mouse, trackball, microphone and/or combinations thereof.

The system 700 can include one or more output interfaces 760. An "output interface" includes any device, component, system, element or arrangement or groups thereof that enable information/data to be presented to a user (e.g., a person, a vehicle occupant, etc.). The output interface(s) 760 can present information/data to the user. The output interface(s) 760 can include a display, an earphone, and/or speaker. Some components of the system 700 may serve as both a component of the input interface(s) 750 and a component of the output interface(s) 760.

The system 700 can include one or more of the actuators 100 as described above. The actuators 100 can be operatively connected to one or more of the elements of the system 700.

The system 700 can include one or more modules, at least some of which will be described herein. The modules can be implemented as computer readable program code that, when executed by a processor, implement one or more of the various processes described herein. One or more of the modules can be a component of the processor(s) 710, or one or more of the modules can be executed on and/or distributed among other processing systems to which the processor(s) 710 is operatively connected. The modules can include instructions (e.g., program logic) executable by one or more processor(s) 710. Alternatively or in addition, one or more data stores 720 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 700 can include one or more control modules 770. The control module(s) 770 can be configured to receive signals, data, information, and/or other inputs from one or more elements of the system 700. The control module(s) 770 can be configured to analyze these signals, data, information, and/or other inputs. The control module(s) 770 can be configured to select one or more of the actuator(s) 100 to be activated or deactivated to achieve a desired effect. In some arrangements, the control module(s) 770 can be configured to select an appropriate one of the actuation profiles 722 in the data store(s) 720 to effectuate the desired actuation. Alternatively or additionally, the control module(s) 770 can be configured to detect user inputs (e.g., commands) provided on the input interface(s) 750. The control module(s) 770 can be configured to send control signals or commands over a communication network 790 to one or more elements of the system 700, including the actuator(s) 100, the contracting member(s) 175, the clutch, and/or any portion thereof.

The control module(s) 770 can be configured to cause the selected one or more of the actuator(s) 100 to be activated or deactivated by activating or deactivating the respective contracting member(s) 175 associated with the selected actuator(s) 100. As used herein, "cause" or "causing" means to make, force, compel, direct, command, instruct, and/or enable an event or action to occur or at least be in a state where such event or action may occur, either in a direct or indirect manner. The control module(s) 770 can selectively provide an activation input to the actuator(s) 100 or, more particularly, to the contracting member(s) 175 associated with the selected actuator(s) 100. The control module(s) 770 can selectively permit or prevent the flow of electrical energy from the power source(s) 740.

The control module(s) 770 can be configured to cause the selected one or more of the actuator(s) 100 to be maintained in an activate condition by activating the respective clutch associated with the selected actuator(s) 100. The control module(s) 770 can selectively provide an activation input to the clutch associated with the selected actuator(s) 100. The control module(s) 770 can selectively permit or prevent the flow of electrical energy from the power source(s) 740. Once the c clutch is activated, the control module(s) 770 can be configured to deactivate the contracting member(s) 175 by discontinuing the activation input. Despite the deactivation of the contracting member(s) 175, the actuator(s) 100 can remain in the activated condition due to the clutch.

The control module(s) 770 can be configured to keep the actuator(s) 100 in the activated condition for as long as needed, such as until a period of time passes, a condition occurs, a user command is provided, etc. It will be appreciated that the amount of power needed to maintain the activated condition of the actuator(s) 100 by the clutch can be substantially less than using the contracting member(s) 175.

The control module(s) 770 can be configured to deactivate the clutch. The control module(s) 770 can be configured to cease the supply of energy from the power source(s) to the clutch. When the clutch is deactivated, the actuator 100 can return or substantially return to the non-activated configuration as the first outer member 140 and the second outer member 150 become relaxed. For example, when the electrostatic clutch 190 is deactivated, the electrostatic connection between the first electrode 192 and the second electrode 194 can end, and the first electrode 192 and the second electrode 194 can be free to move relative to each other.

The various elements of the system 700 can be communicatively linked to one another or one or more other elements through one or more communication networks 790. As used herein, the term "communicatively linked" can include direct or indirect connections through a communication channel, bus, pathway or another component or system. A "communication network" means one or more components designed to transmit and/or receive information from one source to another. The data store(s) 720 and/or one or more other elements of the system 700 can include and/or execute suitable communication software, which enables the various elements to communicate with each other through the communication network and perform the functions disclosed herein.

The one or more communication networks 790 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

Now that the various potential actuators, systems, devices, elements and/or components of the actuator 100 and the system 700 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 8:
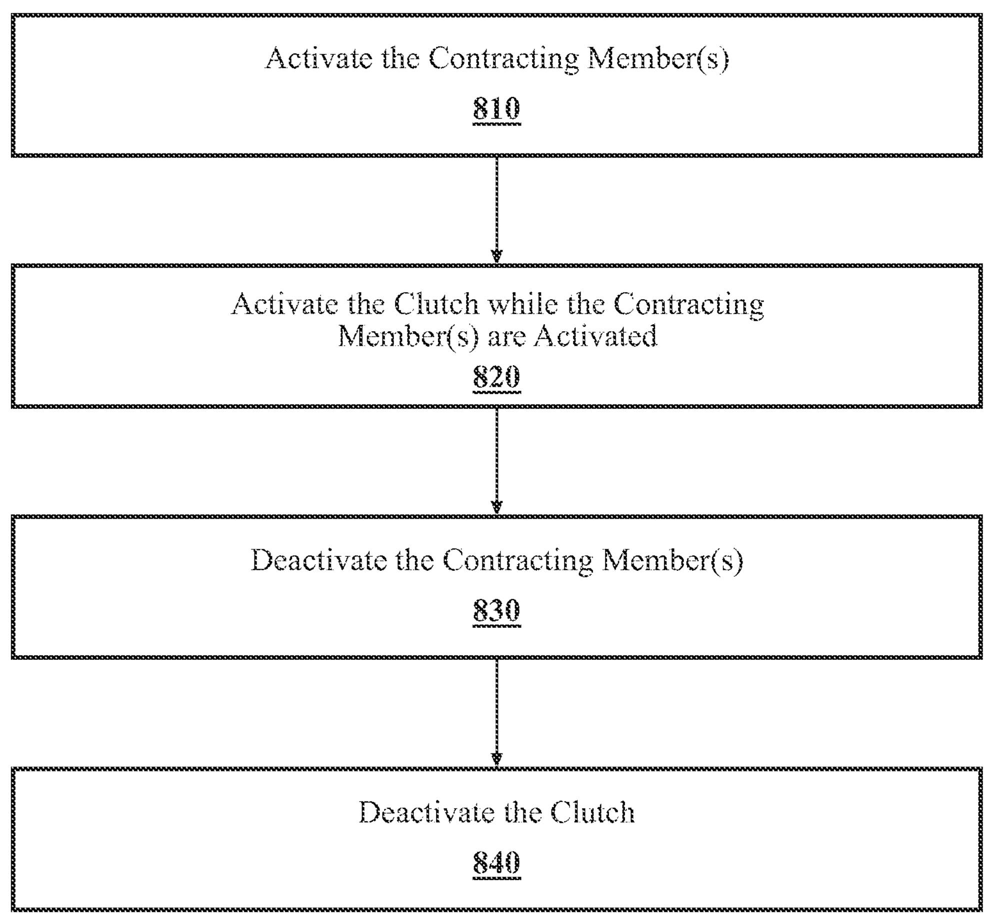
FIG. 8 is an example of an actuation method for the actuator.
Figure 9:
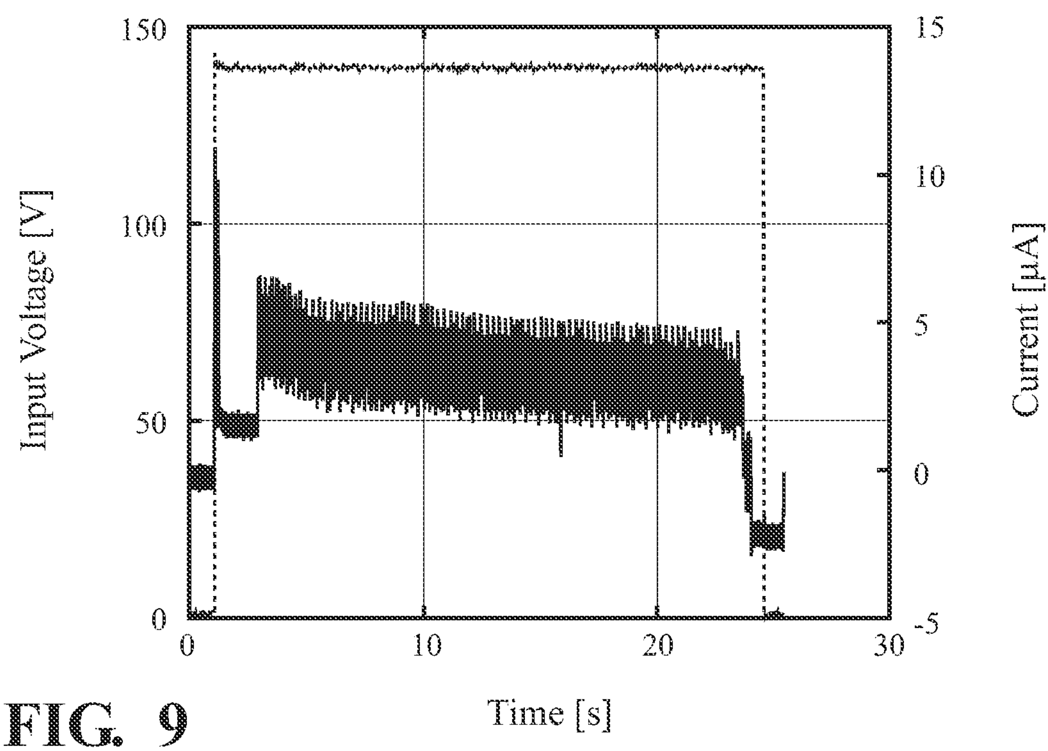
FIG. 9 is a graph of input voltage versus time.
Figure 10:
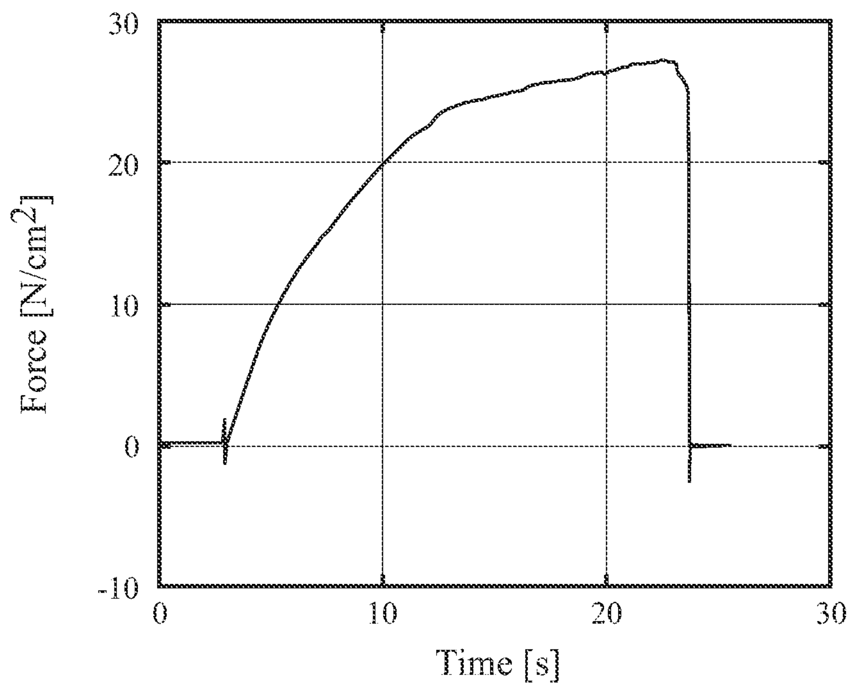
FIG. 10 is an example of a graph of force versus time.

Turning to FIG. 8, an example of a method 800 for actuating the actuator 100 is shown. The actuator can include one or more contracting members and a clutch. The method 800 can apply to any of the actuators, contracting members, and/or clutches described herein.

At block 810, the contracting member(s) can be activated. For instance, the processor(s) 710 and/or the control module(s) 770 can cause electrical energy from the power source(s) 740 to be supplied to the contracting member(s). As a result, the contracting member(s) can contract. The contraction can cause the actuator to morph into an activated configuration. In the activated configuration, a height of the actuator increases over the non-activated configuration of the actuator. The method 800 can continue to block 820.

At block 820, the clutch can be activated while the contracting member(s) are activated. For instance, the processor(s) 710 and/or the control module(s) 770 can allow energy from the power source(s) 740 to be supplied to the clutch. At this point, the actuator can remain in the activated configuration. The method 800 can continue to block 830.

At block 830, the contracting member(s) can be deactivated. For instance, the processor(s) 710 and/or the control module(s) 770 can cause energy from the power source(s) 740 to stop being supplied to the contracting member(s). Though the contracting member(s) are deactivated, the actuator can be maintained in the activated configuration by the clutch. At this point, the contracting member(s) can be allowed to cool. The method 800 can continue to block 840.

At block 840, the clutch can be deactivated. For instance, the processor(s) 710 and/or the control module(s) 770 can cause electrical energy from the power source(s) 740 to stop being supplied to the clutch. As a result, the actuator can substantially return to the non-activated configuration.

The method 800 can end. Alternatively, the method 800 can return to block 810 or to some other block. The method 800 can be repeated at any suitable point, such as at a suitable time or upon the occurrence of any suitable event or condition.

Arrangements described herein can be used in various applications. For instance, arrangements described herein can be used in connection with robotics/exoskeletons, lightweight actuators in vehicles, and seats (e.g., vehicle seats, chairs, gaming chairs, massaging chairs, etc.), just to name a few possibilities.

It will be appreciated that arrangements described herein can provide numerous benefits, including one or more of the benefits mentioned herein. For example, arrangements described herein can provide an actuation scheme that can provide a high actuation force/torque by the contracting member(s) and that can maintain the actuation status at low energy consumption level by the assembly and packaging of the clutch. Arrangements described herein can reduce energy consumption from contracting member activation. Arrangements described herein can allow the contracting member(s) to dissipate heat and quickly returns to an original state when the clutch is disengaged.

With respect to reduced power consumption, SMA wire actuators typically require currents in the range of about 1 to about 20 ampere (A) and voltage in a range of about 1 to about 30 volts (V) depending on wire diameter and length. This results in power consumption on the order of watts (W). In comparison, an electrostatic clutch requires currents in the range of about 1 to about 100 microampere (μA) and voltage in the range of about 100 V, resulting in a power consumption in the milliwatt (mW) range, three orders of magnitude lower than required by the SMA wire actuators. For example, the applied voltage, measured current, and measured force of an electrostatic clutch are plotted in FIGS. 9 and 10. The voltage is 140 V, and average current is about 4 microampere under tension, resulting in a power consumption of 0.56 mW.

With respect to the quick return to the original shape, power to the contracting member(s) 175 (e.g., the shape memory material member(s) 180) can be immediately turned off after actuation stroke because the final activated condition of the actuator 100 can be maintained by the clutch. Therefore, cooling of the contracting member(s) 175 can begin immediately after the activated condition of the actuator 100 is achieved. Subsequently, the actuator 100 can return or substantially return to its original, non-activated condition by turning off the clutch. In the case of an electrostatic clutch, disengagement of electrostatic clutch typically occurs in less than about 2 seconds.

It will be appreciated that the above system 700 and method 800 can apply to any of the actuators 100 and any of the actuators, contracting members, and/or clutches described herein.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. An actuator, comprising:

one or more actuator body members;

one or more contracting members; and a clutch, the one or more contracting members and the clutch being operatively connected to at least one of the one or more actuator body members, when an activation input is provided to the one or more contracting members, the one or more contracting members contract, thereby causing the actuator to morph into an activated configuration in which a height of the actuator increases, the clutch being configured to maintain the actuator in the activated configuration when the activation input to the one or more contracting members is discontinued.

2. The actuator of claim 1, wherein the clutch includes a first clutch element and a second clutch element, and wherein the first clutch element and the second clutch element are configured to move relative to each other.

3. The actuator of claim 2, wherein the first clutch element and the second clutch element are substantially parallel to each other.

4. The actuator of claim 2, wherein the first clutch element and the second clutch element are configured to slide relative to each other.

5. The actuator of claim 2, wherein, in a non-activated condition, the first clutch element and the second clutch element overlap each other by a first amount, wherein, in an activated condition, the first clutch element and the second clutch element overlap each other by a second amount, and wherein the second amount is greater than the first amount.

6. The actuator of claim 2, wherein the clutch is a magnetic clutch.

7. The actuator of claim 6, wherein, when the clutch is activated, the first clutch element and the second clutch element are magnetically attracted to each other such that the actuator is maintained in the activated configuration when the activation input to the one or more contracting members is discontinued.

8. The actuator of claim 2, wherein the clutch is a mechanical clutch.

9. The actuator of claim 8, wherein the first clutch element and the second clutch element are configured for interlocking engagement, and wherein, when the actuator morphs into the activated configuration, the first clutch element and the second clutch element become mechanically engaged to each other such that the actuator is maintained in the activated configuration when the activation input to the one or more contracting members is discontinued.

10. The actuator of claim 2, wherein the clutch is an electrostatic clutch.

11. The actuator of claim 1, wherein the clutch includes a motor and a tensioning element, wherein, when the clutch is activated, the motor tensions the tensioning element such that the actuator is maintained in the activated configuration when the activation input to the one or more contracting members is discontinued.

12. The actuator of claim 1, wherein the one or more contracting members are one or more shape memory material members.

13. A system comprising:

an actuator including one or more contracting members and a clutch; and one or more processors operatively connected to selectively and independently activate the one or more contracting members and the clutch, when an activation input is provided to the one or more contracting members, the one or more contracting members contract, thereby causing the actuator to morph into an activated configuration in which a height of the actuator increases, the clutch being configured to maintain the actuator in the activated configuration when the activation input to the one or more contracting members is discontinued.

14. The system of claim 13, further including:

one or more power sources operatively connected to supply electrical energy to the one or more contracting members and to the clutch, wherein the one or more processors are operatively connected to the one or more power sources, wherein the one or more processors are configured to selectively control a supply of energy from the one or more power sources to the one or more contracting members and to the clutch.

15. The system of claim 14, wherein the one or more processors are configured to:

activate the one or more contracting members to cause the one or more contracting members to contract, thereby causing the actuator to morph into the activated configuration; and activate the clutch while the one or more contracting members are activated; and deactivate the one or more contracting members, whereby the actuator is maintained in the activated configuration by the clutch.

16. The system of claim 13, wherein the clutch includes a first clutch element and a second clutch element, and wherein the first clutch element and the second clutch element are configured to move relative to each other.

17. The system of claim 16, wherein the clutch is a magnetic clutch.

18. The system of claim 17, wherein, when the clutch is activated, the first clutch element and the second clutch element are magnetically attracted to each other element such that the actuator is maintained in the activated configuration when the activation input to the one or more contracting members is discontinued.

19. The system of claim 16, wherein the first clutch element and the second clutch element are substantially parallel to each other.

20. The system of claim 16, wherein the first clutch element and the second clutch element are configured to slide relative to each other.

21. The system of claim 16, wherein, in a non-activated condition, the first clutch element and the second clutch element overlap each other by a first amount, wherein, in an activated condition, the first clutch element and the second clutch element overlap each other by a second amount, and wherein the second amount is greater than the first amount.

22. The system of claim 16, wherein the clutch is a mechanical clutch.

23. The system of claim 22, wherein the first clutch element and the second clutch element are configured for interlocking engagement, and wherein, when the actuator morphs into the activated configuration, the first clutch element and the second clutch element become mechanically engaged to each other such that the actuator is maintained in the activated configuration when the activation input to the one or more contracting members is discontinued.

24. The system of claim 16, wherein the clutch is an electrostatic clutch.

25. The system of claim 13, wherein the clutch includes a motor and a tensioning element, wherein, when the clutch is activated, the motor tensions the tensioning element such that the actuator is maintained in the activated configuration when the activation input to the one or more contracting members is discontinued.

26. The system of claim 13, wherein the one or more contracting members are one or more shape memory material members.

27. An actuation method for an actuator including one or more contracting members and a clutch, the method comprising:

activating the one or more contracting members to cause the one or more contracting members to contract, thereby causing the actuator to morph into an activated configuration, whereby a height of the actuator increases;

activating the clutch while the one or more contracting members are activated; and deactivating the one or more contracting members, whereby the actuator is maintained in the activated configuration by the clutch.

28. The actuation method of claim 27, further including:

deactivating the clutch, whereby the actuator substantially returns to a non-activated configuration.

29. The method of claim 27, wherein the clutch includes a first clutch element and a second clutch element, wherein the first clutch element and the second clutch element are configured to move relative to each other.

30. The method of claim 29, wherein the first clutch element and the second clutch element are substantially parallel to each other.

31. The method of claim 29, wherein the first clutch element and the second clutch element are configured to slide relative to each other.

32. The method of claim 29, wherein the clutch is a magnetic clutch.

33. The method of claim 32, wherein, when the clutch is activated, the first clutch element and the second clutch element are magnetically attracted to each other such that the actuator is maintained in the activated configuration when the one or more contracting members are deactivated.

34. The method of claim 29, wherein the clutch is a mechanical clutch.

35. The method of claim 34, wherein the first clutch element and the second clutch element are configured for interlocking engagement, and wherein, when the actuator morphs into the activated configuration, the first clutch element and the second clutch element become mechanically engaged to each other such that the actuator is maintained in the activated configuration when the one or more contracting members are deactivated.

36. The method of claim 29, wherein the clutch is an electrostatic clutch.

37. The method of claim 27, wherein the clutch includes a motor and a tensioning element, wherein, when the clutch is activated, the motor tensions the tensioning element such that the actuator is maintained in the activated configuration when the one or more contracting members are deactivated.

38. The method of claim 27, wherein the one or more contracting members are one or more shape memory material members.

* * * * *